(12) United States Patent
Shirai et al.

(10) Patent No.: US 11,930,228 B2
(45) Date of Patent: Mar. 12, 2024

(54) COMPUTER PROGRAM, SERVER DEVICE, TERMINAL DEVICE AND METHOD

(71) Applicant: GREE, Inc., Tokyo (JP)

(72) Inventors: Akihiko Shirai, Tokyo (JP); Yousuke Yamanouchi, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/030,942

(22) Filed: Sep. 24, 2020

(65) Prior Publication Data

US 2021/0099735 A1  Apr. 1, 2021

(30) Foreign Application Priority Data

Sep. 27, 2019  (JP) ................................ 2019-177503

(51) Int. Cl.
| | |
|---|---|
| *H04N 21/2343* | (2011.01) |
| *H04N 21/218* | (2011.01) |
| *H04N 21/2187* | (2011.01) |
| *H04N 21/232* | (2011.01) |
| *H04N 21/235* | (2011.01) |
| *H04N 21/8545* | (2011.01) |

(52) U.S. Cl.
CPC ... *H04N 21/2343* (2013.01); *H04N 21/21805* (2013.01); *H04N 21/2187* (2013.01); *H04N 21/232* (2013.01); *H04N 21/235* (2013.01); *H04N 21/8545* (2013.01)

(58) Field of Classification Search
CPC ............. H04N 21/2343; H04N 21/232; H04N 21/2187; H04N 21/235; H04N 21/21805; H04N 21/8545; H04N 21/4781; H04N 21/6587; H04N 7/157; H04N 21/8146; H04L 12/1813; H04L 12/1827; H04L 12/1831; H04L 65/1093; H04L 67/131; H04L 65/612; G06F 13/00; G06T 19/00
See application file for complete search history.

(56) References Cited

U.S. PATENT DOCUMENTS

| | | | |
|---|---|---|---|
| 7,038,699 B2 | 3/2006 | Sato et al. | |
| 11,277,585 B2 * | 3/2022 | Kawakami | .......... H04L 12/1813 |

(Continued)

FOREIGN PATENT DOCUMENTS

| | | |
|---|---|---|
| JP | 2002-271693 A | 9/2002 |
| JP | A-2016-187063 | 10/2016 |

(Continued)

OTHER PUBLICATIONS

Notification of Reasons for Refusal, issued by Japanese Patent Office in corresponding with Japanese Application No. 2019-177503, dated Dec. 26, 2022 (6 pages).

*Primary Examiner* — Alazar Tilahun
(74) *Attorney, Agent, or Firm* — Finnegan, Henderson, Farabow, Garrett & Dunner LLP

(57) ABSTRACT

A computer program according allows a processor to function such that a first stream of a first data type including a motion, a sound, a comment, or information according to gifting is retrieved, a second stream of a second data type including a video is retrieved, data according to the first stream and data according to the second stream are synthesized, and the synthesized data is provided. In addition, the first data type includes intermediate information according to the video. In addition, the intermediate information includes depth information according to the video.

29 Claims, 15 Drawing Sheets

(56) References Cited

U.S. PATENT DOCUMENTS

| | | | |
|---|---|---|---|
| 2006/0140508 A1* | 6/2006 | Ohgishi | H04N 5/262 |
| | | | 382/284 |
| 2017/0006074 A1* | 1/2017 | Oates, III | H04L 65/4076 |
| 2018/0074679 A1* | 3/2018 | Wang | G06F 3/04812 |
| 2018/0204381 A1* | 7/2018 | Kanatsu | H04N 5/247 |
| 2018/0295389 A1 | 10/2018 | Kakurai | |
| 2018/0343442 A1* | 11/2018 | Yoshikawa | G08B 13/19641 |
| 2019/0208230 A1* | 7/2019 | Fan | H04N 21/4316 |
| 2019/0364224 A1* | 11/2019 | Nishibe | H04N 13/271 |
| 2021/0176288 A1* | 6/2021 | Ahuja | H04L 67/08 |

FOREIGN PATENT DOCUMENTS

| | | |
|---|---|---|
| JP | 2018-74294 A | 5/2018 |
| JP | 2019-37549 A | 3/2019 |
| JP | A-2019-37549 | 3/2019 |
| JP | 6543403 B1 | 6/2019 |
| WO | WO 2018/142494 A1 | 8/2018 |

* cited by examiner

| EXAMPLE OF INFORMATION ACQUIRABLE BY ACQUISITION UNIT |
|---|
| VIDEO |
| MOTION |
| SOUND |
| COMMENT |
| INFORMATION ACCORDING TO GIFTING |
| INTERMEDIATE INFORMATION |
| CONTROL INFORMATION |
| ... |

FIG. 4

| EXAMPLE OF CONTROL INFORMATION | |
|---|---|
| VIEWPOINT CONTROL INFORMATION | INFORMATION RELEVANT TO CHANGE OF VIEWPOINT |
| PRODUCTION CONTROL INFORMATION | INFORMATION RELEVANT TO CONTROL OF PRODUCTION |
| ... | ... |

FIG. 12

COMPUTER PROGRAM, SERVER DEVICE, TERMINAL DEVICE AND METHOD

CROSS REFERENCE TO RELATED APPLICATIONS

This application claims priority to Japanese Patent Application No. 2019-177503 filed Sep. 27, 2019, the contents of which is incorporated herein by reference in its entirety.

BACKGROUND

Technical Field

A technology disclosed in the present application relates to a computer program, a server device, a terminal device, and a method.

Related Art

The recent user tends to want an interactive application with a high degree of participation, and thus, a system that is capable of supporting such an interactive application is desired.

In a technology described in JP 2018-74294 A, the background and a video in a 3D computer graphics (3DCG) space are synthesized. In addition, in a technology described in JP 2019-37549 A, a player and a participant have an interaction. In addition, in a technology described in JP 2002-271693 A, a photographed image and a virtual image are synthesized. In addition, a technology described in JP 6543403 B2 relates to moving image distribution. All of JP 2018-74294 A, JP 2019-37549 A, JP 2002-271693 A, and JP 6543403 B2 described above are incorporated herein by reference in their entirety.

In some embodiments disclosed in the present application, a computer program, a server device, a terminal device, and a method, which are capable of supporting an interactive application, are provided.

SUMMARY

A computer program according to one aspect retrieves a first stream of a first data type including a motion, a sound, a comment, or information according to gifting, retrieves a second stream of a second data type including a video, synthesizes data according to the first stream and data according to the second stream, and provides the synthesized data, by being executed with a processor.

A server device, according to one aspect, includes: a processor, in which the processor retrieves a first stream of a first data type including a motion, a sound, a comment, or information according to gifting, retrieves a second stream of a second data type including a video, synthesizes data according to the first stream and data according to the second stream, and provides the synthesized data, by executing a computer readable command.

A terminal device, according to one aspect, includes: a processor, in which the processor retrieves a first stream of a first data type including a motion, a sound, a comment, or information according to gifting, retrieves a second stream of a second data type including a video, synthesizes data according to the first stream and data according to the second stream, and provides the synthesized data, by executing a computer readable command.

A method, according to one aspect, to be executed by a processor executing a computer readable command, in which the processor retrieves a first stream of a first data type including a motion, a sound, a comment, or information according to gifting, retrieves a second stream of a second data type including a video, synthesizes data according to the first stream and data according to the second stream, and provides the synthesized data, by executing the command.

BRIEF DESCRIPTION OF DRAWINGS

FIG. 4 is an example of data of the system according to one embodiment;

FIG. 12 is an example of the data of the system according to one embodiment;

DETAILED DESCRIPTION

Hereinafter, various embodiments of the present disclosure will be described with reference to the drawings. It should be noted that constituents illustrated in one drawing may be omitted in another drawing, for convenience of description. In addition, it should be noted that the accompanying drawings illustrate one embodiment of the present disclosure, but are not necessarily drawn to scale. In addition, in this specification, a target indicated by a term such as an application may be referred to as software or a program, or may be commands with respect to a computer that are combined such that a result is obtained. As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

1. EXAMPLE OF SYSTEM

Figure 1:
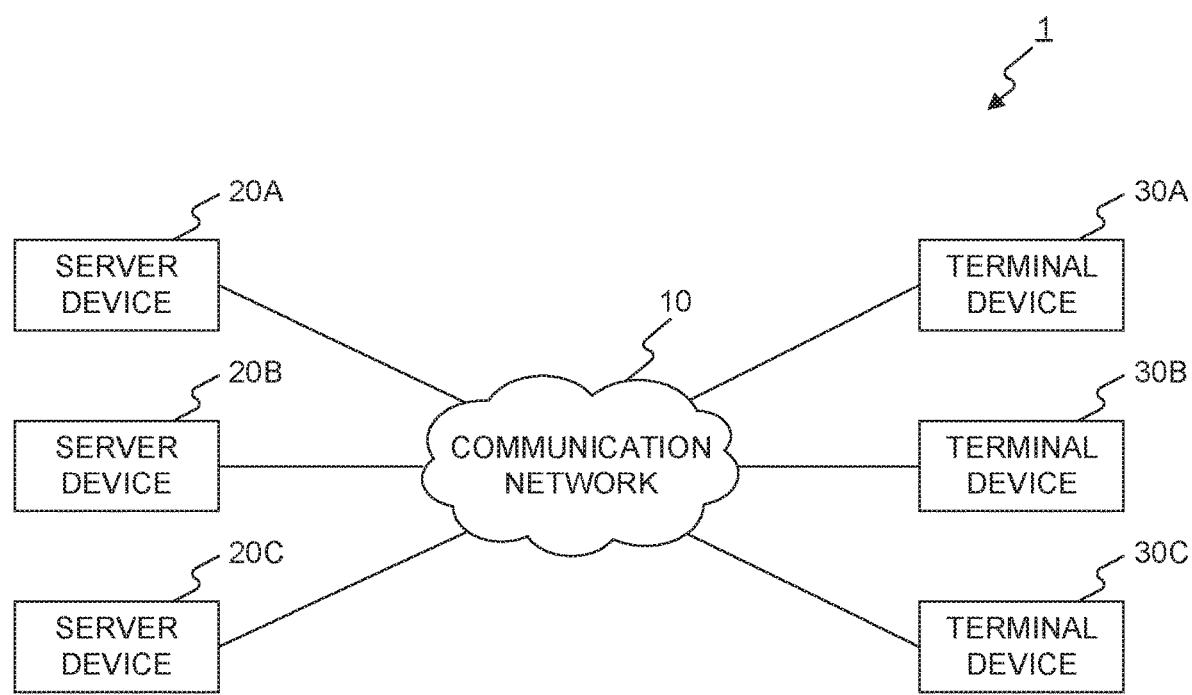
FIG. 1 is a block diagram illustrating an example of a configuration of a system according to one embodiment.

FIG. 1 is a block diagram illustrating an example of a configuration of a system according to one embodiment. As illustrated in FIG. 1, a system 1 may include one or more server devices 20 that are connected to a communication network 10, and one or more terminal devices 30 that are connected to the communication network 10. Note that, in FIG. 1, three server devices 20A to 20C are exemplified as an example of the server device 20, and three terminal devices 30A to 30C are exemplified as an example of the terminal device 30, but the other one or more server devices 20 can be connected to the communication network 10, as the server device 20, and the other one or more terminal devices 30 can be connected to the communication network 10, as the terminal device 30. Note that, in this specification, a term such as a system may include both of a server and a terminal device, or may be used as a term indicating only the server or only the terminal device. That is, the system may only the server, only the terminal device, or both of the server and the terminal device.

In addition, the system may be an information processing device on a cloud. In addition, the system may configure a virtual information processing device, and may be logically configured as one information processing device. In addition, the owner and the manager of the system may be different from each other.

The communication network 10 may be a mobile phone network, a radio LAN, a fixed telephone network, the internet, an intranet, Ethernet (Registered Trademark), or a combination thereof, and the like, but is not limited thereto. In the communication network 10, various data items disclosed in this specification may be subjected to communication. For example, a stream including a first data type, a stream including a second data type, control information, and the like, described below, may be subjected to communication from the server device 20 to the terminal device 30, or may be subjected to communication from the terminal device 30 to the server device 20.

The server device 20 may be capable of executing an operation or the like, such as retrieving a first stream of a first data type including a motion, a sound, a comment, or information relating to gifting, retrieving a second stream of a second data type including a video, synthesizing data according to the first stream and data according to the second stream, and providing the synthesized data, by executing a specific application that is installed. Synthesized data may be generated that is synthesized from the first stream and the second stream. The synthesized data may relate to the first data type and the second data type.

In addition, the terminal device 30 may be capable of executing an operation or the like, such as retrieving a first stream of a first data type including a motion, a sound, a comment, or information according to gifting, retrieving a second stream of a second data type including a video, synthesizing data according to the first stream and data according to the second stream, and providing the synthesized data, by executing a web browser or a specific application that is installed.

The terminal device 30 is an arbitrary terminal device that is capable of executing such an operation, or may be a smartphone, a tablet, a mobile phone (a feature phone) or a personal computer, but is not limited thereto.

2. HARDWARE CONFIGURATION OF EACH DEVICE

Next, an example a hardware configuration of the server device 20 will be described.

2-1. Hardware Configuration of Server Device 20

Figure 2:
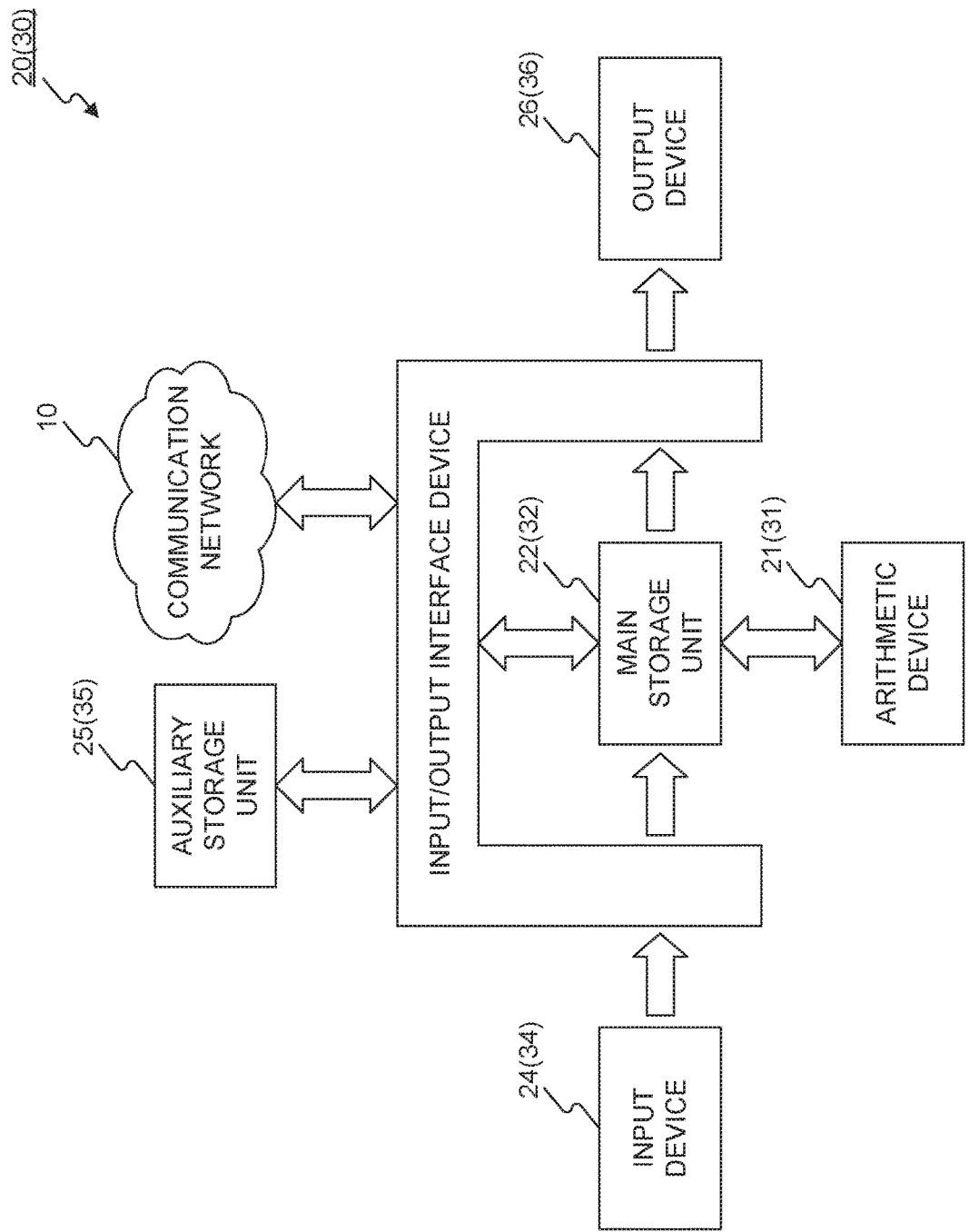
FIG. 2 is a block diagram schematically illustrating an example of a hardware configuration of a server device (a terminal device) illustrated in FIG. 1.

A hardware configuration example of the server device 20 will be described with reference to FIG. 2. FIG. 2 is a block diagram schematically illustrating an example of the hardware configuration of the server device 20 (the terminal device 30) illustrated in FIG. 1 (note that, in FIG. 2, reference numerals in parentheses are described in association with each of the terminal devices 30 as described below).

As illustrated in FIG. 2, the server device 20 is capable of mainly including an arithmetic device 21, a main storage unit 22, and an input/output interface device 23. The server device 20 is capable of further including an input device 24 and an auxiliary output device 26. Such devices may be connected to each other by a data bus or a control bus.

The arithmetic device 21 performs an arithmetic operation by using a command and data that are stored in the main storage unit 22, and stores the result of the arithmetic operation in the main storage unit 22. Further, the arithmetic device 21 is capable of controlling the input device 24, an auxiliary storage unit 25, the output device 26, and the like through the input/output interface device 23. The server device 20 may include one or more arithmetic devices 21. The arithmetic device 21 may include one or more central processing units (CPU), microprocessors, or graphics processing units (GPU).

The main storage unit 22 has a storage function, and stores the command and the data that are received from the input device 24, the auxiliary storage unit 25, the communication network 10, and the like (the server device 20 and the like), and the result of the arithmetic operation of the arithmetic device 21, through the input/output interface device 23. The main storage unit 22 is capable of including a random access memory (RAM), a read only memory (ROM) or a flash memory, without any limitation.

The auxiliary storage unit 25 is a storage unit. A command and data (a computer program) configuring the specific application, the web browser, or the like may be stored in the auxiliary storage unit 25, and the command and the data (the computer program) may be loaded in the main storage unit 22 through the input/output interface device 23, by being controlled with the arithmetic device 21. The auxiliary storage unit 25 may be a magnetic disk device or an optical disk device, a file server, or the like, but is not limited thereto.

The input device 24 is a device importing data from the outside, and may be a touch panel, a button, a keyboard, a mouse or a sensor.

The output device 26 may be capable of including a display device, a touch panel or a printer device, without any limitation. In addition, the input device 24 and the output device 26 may be integrated.

In such a hardware configuration, the arithmetic device 21 sequentially loads the command and the data (the computer program) configuring the specific application, which are stored in the auxiliary storage unit 25, in the main storage unit 22, and performs an arithmetic operation with respect to the loaded command and data, and thus, may be capable of controlling the output device 26 through the input/output interface device 23, or may be capable of transmitting and receiving various information items with respect to the other device (for example, the server device 20, the other terminal device 30, and the like) through the input/output interface device 23 and the communication network 10.

The server device 20 has such a configuration, and executes the installed specific application, and thus, may be capable of executing a part of all of operations or the like (including various operations described below in detail), such as retrieving a first stream of a first data type including a motion, a sound, a comment, or information according to gifting, that are defined below, retrieving a second stream of a second data type including a video, synthesizing data according to the first stream and data according to the second stream, and providing the synthesized data. In addition, such operations or the like may be performed by a user to apply an instruction to a system that is an example of an embodiment disclosed in this specification, with the input device 24 or an input device 34 according to the terminal device 30, described below. In addition, in a case where the program is executed on the arithmetic device 21, the program may be displayed on the output device 26 of the server device 20 as the system that is used by the user, or may be displayed on an output device 36 of the terminal device 30 as the system that is used by the user.

2-2. Hardware Configuration of Terminal Device 30

Similarly, a hardware configuration example of the terminal device 30 will be described with reference to FIG. 2. For example, the same hardware configuration as that of each of the server devices 20 described above can be used as a hardware configuration of each of the terminal devices 30. Therefore, reference numerals with respect to constituents of each of the terminal devices 30 are described in parentheses in FIG. 2.

As illustrated in FIG. 2, each of the terminal devices 30 is capable of mainly including an arithmetic device 31, a main storage unit 32, an input/output interface device 33, the input device 34, an auxiliary storage unit 35, and the output device 36. Such devices may be connected to each other through a data bus or a control bus.

The arithmetic device 31, the main storage unit 32, the input/output interface device 33, the input device 34, the auxiliary storage unit 35, and the output device 36 may be respectively approximately identical to or different from the arithmetic device 21, the main storage unit 22, the input/output interface device 23, the input device 24, the auxiliary storage unit 25, and the output device 26, included in each of the server devices 20 described above. In addition, the capacity or the performance of the arithmetic device or the storage unit may be different. In particular, the input device 34 and the output device 36 will be described below in detail.

In such a hardware configuration, the arithmetic device 31 sequentially loads a command and data (a computer program) configuring a specific application, which are stored in the auxiliary storage unit 35, in the main storage unit 32, and performs an arithmetic operation with respect to the loaded command and data, and thus, may be capable of controlling the output device 36 through the input/output interface device 33, or may be capable of transmitting and receiving various information items with respect to the other device (for example, each of the server devices 20 and the like) through the input/output interface device 33 and the communication network 10.

The terminal device 30 has a such configuration, and thus, may be capable of executing a part or all of operations or the like (including various operations described below in detail), such as retrieving a first stream of a first data type including a motion, a sound, a comment, or information according to gifting, retrieving a second stream of a second data type including a video, synthesizing data according to the first stream and data according to the second stream, and providing the synthesized data. In addition, by executing the installed web browser, a web page can be received and displayed from the server device 20, and the same operation can be executed. In addition, such operations or the like may be performed by the user to apply an instruction to the system that is an example of an embodiment disclosed in this specification, with the input device 34. In addition, in a case where a program is executed on the arithmetic device 31, the program may be displayed on the output device 36 of the terminal device 30 as the system that is used by the user.

In this specification, the terminal device may be referred to as a "user terminal", a person who uses the user terminal may be referred to as a user (in a case where an application that is supported is a game, the user may be related people of the game, such as audience of the game, a player of the game, a referee of the game, and characters in the game. Such related people of the game, such as the audience of the game, the referee of the game, and the characters in the game are the narrower concept of the user). In addition, in the user terminal, a terminal that is capable of providing an information source may be referred to as an "information source terminal" (accordingly, in the case of the information source terminal, the terminal is the user terminal). A person who uses the information source terminal may be referred to as an information source provider (in a case where an application that is supported is a game, the information source provider may be the player of the game. The player of the game may be the narrower concept of the information source provider, and the information source provider may be the narrower concept of the user). For this reason, one information processing device may be referred to as the information source terminal from the viewpoint of the information source provider using such a device, and may be referred to as user terminal from the viewpoint of using such a device as the user. Note that, in the system according to the present application, the user may be managed by an ID for specifying the user. Such an ID for specifying the user may be stored in the system according to the present application, or may be managed in the system according to the present application. One user may include one or a plurality of IDs. In the present application, a user terminal that is used as an ID for specifying a user A, for example, may be referred to as a user terminal that is used by the user A, a user terminal according to the user A, or the like. Similarly, an information source terminal that is used as an ID for specifying an information source provider A may be referred to as an information source terminal that is used by the information source provider A, an information source terminal according to the information source provider A, or the like.

The user terminal may include various devices that are capable of inputting information and of retrieving information, as the input device 34. In addition, the user terminal may generate information by the arithmetic device 31. Information retrieved in such a user terminal (hereinafter, "retrieve" may include the case of receiving, transmitting, or acquiring the generated information) may be transmitted to the communication network 10 through the input/output interface device 23.

For example, the user terminal may include a keyboard, a touch panel, and the like, which are capable of inputting a comment and of retrieving a comment that is text information, as the input device 34. In addition, the user terminal may have a function of generating a constant comment by the input device 34. Similarly, the retrieved comment may be transmitted to the communication network 10 through the input/output interface device 23.

Note that, a comment according to the present disclosure may be automatically generated by the system, in addition to a comment that is input by the user terminal. Such a comment may be transmitted to the user terminal, and may be displayed on the user terminal. The comment that is automatically generated by the system, for example, may be a comment for describing a situation. The comment for describing the situation may be a comment due to the action of the user, or may be a comment not due to the action of the user. The comment due to the action of the user, for example, may be "A has entered the room" in a case where a certain user starts the use, or may be "the number of viewers has exceeded X" in a case where the number of users is greater than a predetermined number. Here, in a case where the number of users is greater than the predetermined number, the distribution of a predetermined game, a predetermined application, a predetermined moving image, or the like may be the total number of viewers from the beginning of the distribution or the total number of viewers from the beginning of the distribution in the current distribution, or the total number of users who are currently viewing in the current distribution, obtained by subtracting the number of users who are not viewing from the total number of viewers, or the like may be greater than the predetermined number. In addition, the comment due to the action of the user may be a comment such as "A has given an item B" in the case of gifting.

In addition, the user terminal may include a microphone that is capable of retrieving a sound, as the input device 34. Note that, the human voice may be treated as a sound by being retrieved by the microphone as the input device 34, or may be treated as a comment by being retrieved by the microphone as the input device 34, and then, by converted into text by sound recognition of the arithmetic device 31. Note that, the user terminal may generate a sound by the arithmetic device 31. Similarly, such a sound or comment that is retrieved may be transmitted to the communication network 10 through the input/output interface device 23.

In addition, the information source terminal that is one aspect of the user terminal may include a motion sensor that is capable of sensing the human motion, as the input device 34. The motion sensor may have a function capable of sensing the motion of each portion by being mounted on the body of the user or the information source provider. Examples of each portion of the body are capable of including various portions such as a head portion, a face, upper arms, front arms, hands, thighs, lower thighs, feet, and a body trunk, but are not limited to a part or all thereof, and the motion sensor may be capable of being mounted in a position in which the motion of the body can be sensed. The motion sensor may include an acceleration sensor, a gyroscope sensor, a geomagnetic sensor, and the like. Similarly, such information that is retrieved may be transmitted to the communication network 10 through the input/output interface device 23.

In addition, the information source terminal that is one aspect of the user terminal may include an imaging device that is capable of imaging a moving image, as the input device 34. The imaging device may image the head, the face, the eyes, a part of the body, the entire body, and the like of the user or the information source provider. In a case where the head or the face is imaged, the imaging device is capable of sensing a face direction, in a case where the face is imaged, the imaging device is capable of sensing a neutral expression, in a case where the eyes are imaged, the imaging device is capable of sensing a visual line, and in a case where a part of the body or the entire body is imaged, the imaging device is capable of sensing the motion of the body, along with or instead of the motion sensor described above. Similarly, information retrieved with respect to the face direction, the visual line, the neutral expression, and the motion of the body, based on such imaging information, may be transmitted to the communication network 10 through the input/output interface device 23.

The output device 36 of the user terminal may be a display device and a sound generation device. The display device may be various devices insofar as having a displayable function, and examples thereof include a liquid crystal display, a plasma display, an organic EL display, a micro LED display, a head-mounted display, and the like, but the display device is not limited thereto, and may be various devices. The sound generation device may be a speaker, a headphone, earphones, and the like. Information that is output by the output device 36 may be information generated in the arithmetic device 31, or may be information received from the communication network 10.

3. FUNCTION OF EACH DEVICE

Figure 3:
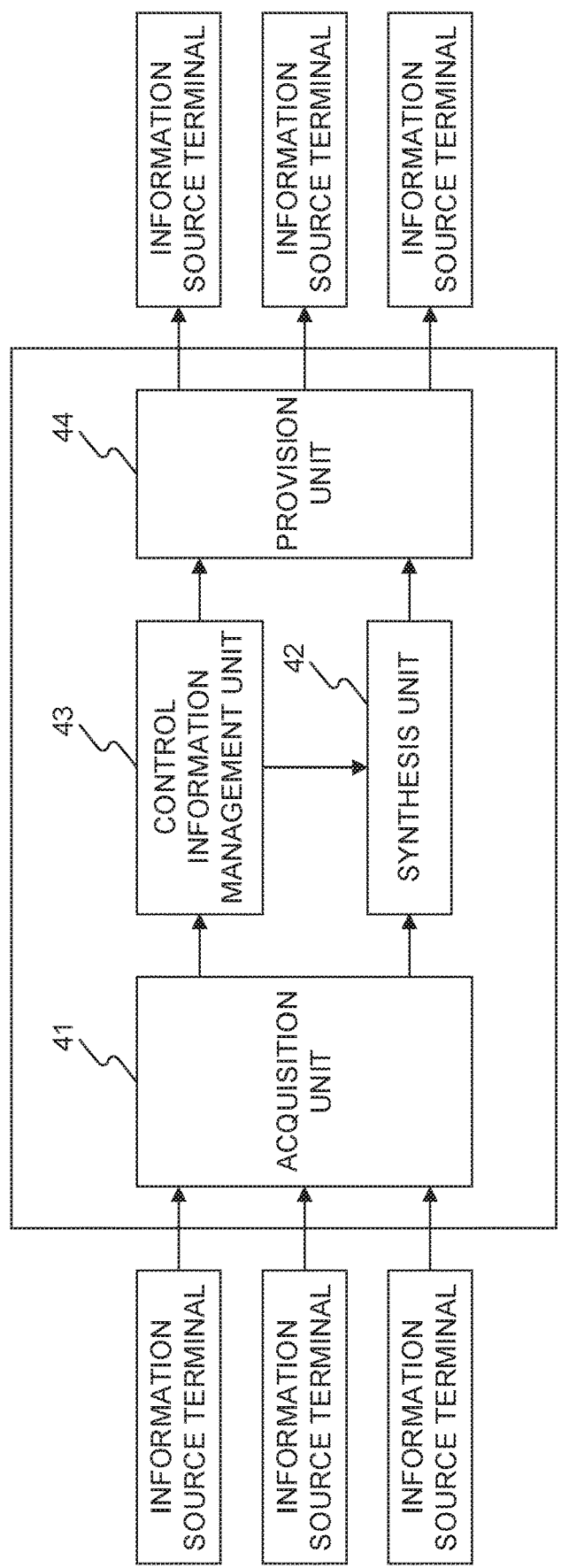
FIG. 3 is a block diagram schematically illustrating an example of a function of the system according to one embodiment.

Next, an example of the function of each of the server device 20 and the terminal device 30 will be described with reference to FIG. 3. FIG. 3 is a block diagram schematically illustrating an example of the function of the system illustrated in FIG. 1. As illustrated in FIG. 3, the system of an example may include an acquisition unit 41 retrieving various data items, a synthesis unit 42 synthesizing a part or all of the retrieved data items, and a provision unit 44 providing the synthesized data. In addition, the system of an example may include a control information management unit 43 managing control information. Note that, FIG. 3 is a diagram focusing on the function, and as it is obvious from the description in this specification, hardware in which such a function is executed may be the server, may be the information source terminal, may be the user terminal, or may be a combination thereof. Therefore, the function according to the system of each example may be executed on the server, may be executed on the information source terminal, may be executed on the user terminal, or may be executed on a plurality of hardware by being dispersed. Note that, FIG. 3 illustrates an aspect in which the acquisition unit 41 retrieves information from the information source terminal, but as described below, the acquisition unit 41 may retrieve information from the user terminal. In addition, similarly, the provision unit 44 may provide information to the user terminal, or may provide information to the information source terminal that is one aspect of the user terminal.

3-1. Acquisition Unit 41

The acquisition unit 41 has a function of retrieving information according to the system of this example. The information according to the system of this example, which is retrieved by the acquisition unit 41, may be various types of data items.

The acquisition unit 41 may retrieve a stream (may be referred to as streaming, but in this specification, unified as a stream), as data. That is, the acquisition unit 41 may retrieve a first stream of a first data type including a motion, a sound, a comment, or information according to gifting, and may retrieve a second stream of a second data type including a video. The contents of data that is transmitted by the stream may be a motion, a sound, a comment, intermediate information, information according to gifting, a video (including a moving image and a still image), and the like. The video may a video according to a game, or may be a video imaged by the imaging device. The video according to the game may be a video that is executed in the game, or may be a game video that is played by a player in the game. In addition, the video imaged by the imaging device may be various videos such as a video obtained by imaging the nature, a video obtained by imaging the city, and a video of an attraction, an event, or the like, without any limitation in the type thereof. In addition, the contents of the data that is transmitted by the stream may be face direction information, visual line information, neutral expression information, and the like, in addition to or instead of the above.

In this specification, for convenience, the stream may be sorted into the first data type and the second data type. Examples of the first data type include the motion, the sound, the comment, the intermediate information, the information according to the gifting, and the like, but the first data type is not limited thereto, and may be the face direction information, the visual line information, the neutral expression information, and the like, described above. The second data type may be data having a background function that is basically displayed, and examples of the second data type include the video.

The motion, the sound, and the comment may be as described above.

The intermediate information is information that is used in synthesis described below. By using the intermediate information, there is an advantage that it is possible to decrease a capacity that is comprehensively transmitted, and to decrease a load in a communication band.

Examples of the intermediate information include depth information, mask information, a low resolution rendering image, font rendering, UI (HP, MP, a score, language dependent information, individual information), and the like.

The depth information has an advantage that in a case where depth information of each of the depth of one of at least two information items, such as a moving image and an avatar, and the depth of the other one is determined, one information item may not be used, and it is not necessary to send information relevant to one information item that is not used. For example, in a case where an avatar is moved to the back side of a game video that is broadcast live, and the avatar is completely disappears from the game video that is broadcast live, it is not necessary to send information relevant to the disappearing avatar, and it is possible to decrease a communication amount. From such a reason, information according to the depth information to be displayed may be send as the intermediate information. That is, the first data type may include intermediate information according to a video, and the intermediate information may include depth information according to a video.

The mask information may be information according to covering a predetermined portion. For example, the mask information may be coordinate information for indicating a region for covering a predetermined region of a video. In addition, the mask information may include information according to a covering time. By synthesizing video information and the mask information, there is an advantage that it is possible to cover a predetermined portion of a video.

Examples of the low resolution rendering image include a thumbnail. The low resolution rendering image may be an image having a resolution lower than the resolution of the original image. As described above, the low resolution rendering image may be an image having a resolution lower than the resolution of the original image, and thus, it is possible to reduce a communication load, and for this reason, for example, in a case where a thumbnail of a plurality of images is displayed on the user terminal, the thumbnail is subjected to communication by being synthesized with other data items, instead of the communication of the original image, and therefore, there is an advantage that it is possible to reduce a communication capacity and to transmit one or a plurality of thumbnails, compared to direct communication of the original image.

The font rendering may be information that is necessary at the time of rendering a font. In a case where communication is performed after rendering the font, the font becomes image information by the rendering, and thus, the communication amount can be increased. For this reason, setting information of a font indicating which rendering is to be performed is subjected to communication, and the font is subjected to the rendering by using such setting information in a stage of being displayed, and thus, there is an advantage that it is possible to reduce the communication load.

The HP, the MP, the score, the language dependent information, the individual information, and the like are information associated with the profile of the user according to the user terminal on which the information is displayed. Here, the HP, the MP, and the score indicate information of the user but not information according to the information source provider. The language dependent information and the individual information are the information associated with the profile of the user. Such information items are displayed on the user terminal, but it is sufficient that the information is synthesized in a stage of being displayed on the user terminal, and the information may be information different for each user terminal on which the information is displayed. For this reason, such information items may be subjected to communication separately from the original data. Note that, the language dependent information may be set in accordance with each of the user terminals as described above, or may be synthesized in the server, the user terminal, or the information source terminal by using a language that is used in most user terminals of user terminals viewing the same synthesized data, such as viewing the same video or participating in the same game. The language that is used in the most user terminals may be determined in the server, the information source terminal, or the like, and such determination may be performed by retrieving a language that is used in each of the user terminals, by counting the number of user terminals in which each of the languages is used, and by specifying the language that is used in the most user terminals, in the languages that are used. In addition, a language environment of such language dependent information may be set with reference to locale information that is the setting of a country or a place in which the user terminal is positioned, and the language environment may be in conjunction with a coordinate or a direction in a real space, such as the position of the user terminal that is measured by a GPS in the terminal or the orientation of the terminal, and seat information of a person who retains the user terminal in an event site or a movie theater.

As described above, all of the information processing devices synthesizing each data item are not the same, and synthesis may be performed on a suitable information processing device in accordance with the information that can be synthesized. For example, the information associated with the profile of each of the users, such as the font rendering, the HP, the MP, the score, the language dependent information, and the individual information, may be synthesized on the user terminal on which the information is displayed, or information closely associated with the video, such as the depth information, may be synthesized on the server device.

The information according to the gifting is information related to providing a gift. The information according to the gifting, for example, may be a part or all of the type of gift to be provided, the number of gifts to be provided, owner information of the gift to be provided, partner information to be provided with the gift, and a provision timing of the gift to be provided (for example, provision date and time). The owner information and the partner information may be information that is capable of specifying the owner or the partner, such as the name of the user, an ID, and a user terminal ID. In addition, information of the amount of gift, the level of gift, and a restriction according to the gift, and the like may be included in the information according to the gifting.

In addition, the acquisition unit 41 may retrieve the control information described below, which is managed by the control information management unit 43. Examples of the control information include viewpoint control information, production control information, and the like. The control information may be retrieved in the acquisition unit 41, as a stream.

The stream may or may not include a time stamp. In the case of including the time stamp, there is an advantage that temporal adjustment can be performed. That is, each of the first stream and the second stream may include the time information.

A protocol of the information that is retrieved by the acquisition unit 41 may be any protocol. The protocol may be a protocol in which information can be mainly bidirectionally interactively transmitted, or may be a protocol in which information can be mainly unidirectionally transmitted. Examples of the former include real time messaging protocol (RTMP), and examples of the latter include hypertext transfer protocol (HTTP), HTTP live streaming (HLS), or WebSocket (RFC6455), but the protocol is not limited thereto. In addition, a communication path (CDN) may be different for each protocol, or a charging model may be different in each processing.

The acquisition unit 41 may retrieve the information from the same information processing device as that of the program in which the acquisition unit 41 is executed, or may retrieve the information from an information processing device different from that of the program in which the acquisition unit 41 is executed. In the latter, the acquisition unit 41 may retrieve the information from the other information processing device on a network. The acquisition unit 41 may directly or indirectly retrieve the information from the other information processing device. In particular, recently, the network has been complicatedly configured, and thus, an aspect may be assumed in which the information processing device in which the program having an acquisition function is executed retrieves the information from the other information processing device through one or a plurality of information processing devices, as the indirect acquisition. In addition, the acquisition unit 41 may retrieve the information from the user terminal, or may retrieve the information from information source terminal.

The acquisition unit 41 may store the information that is retrieved by the acquisition unit 41 in the system. In addition, the acquisition unit 41 may manage the information that is retrieved by the acquisition unit 41. Note that, the acquisition unit 41 may suitably set a storage period in accordance with the type of information that is retrieved by the acquisition unit 41.

3-2. Synthesis Unit 42

The synthesis unit 42 has a function of synthesizing the stream that is retrieved by the acquisition unit 41. For example, the synthesis unit 42 may have a function of generating synthesized data (e.g., synthesizing the data) according to the first stream and the data according to the second stream.

A synthesis method may include various methods. Various methods for synthesizing information of one stream and information of the other stream may be used as the synthesis method itself. For example, one stream and the other stream may be overlapped in each shape thereof. In this case, for example, one stream having a rectangular shape and the other stream having a rectangular shape may be synthesized by being overlapped. For example, one stream having the rectangular shape and the other stream having the rectangular shape may be superimposed. In addition, one or both of the shape of one stream and the shape of the other stream may be overlapped by being modified. For example, the shape of the other stream may be changed to be fittable into a part of the shape of one stream, and the shape may be modified as with fitting synthesis, and then, one stream and the other stream may be synthesized by being overlapped. In addition, a constant effect may be applied to one or both of one stream and the other stream, and then, one stream and the other stream may be synthesized. In this case, examples of the effect include changing a color, a style, a chromatic value, or the like, and the effect may be settling into the space.

In addition, in the synthesis, in the case of suitably supplementing lacking information, an information amount to be subjected to communication is small, and thus, there is an advantage that the communication load decreases. For example, the motion is in motion information, and thus, information of an avatar that is a target to be moved is supplemented, and therefore, it is possible to attain the motion of the avatar. In this case, information including the avatar is not subjected to communication, but only the motion of the avatar is subjected to communication, and thus, there is an advantage that it is possible to decrease the communication load. In order for such synthesis, the synthesis unit 42 may include model data of the avatar according to the motion. The synthesis unit 42 may synthesize the model data of the avatar according to the motion and the motion, and thus, may attain the motion of the avatar according to the motion. In addition, the synthesis unit 42 may include object data. The object data may include data according to the background of a virtual space in which the avatar exists and various objects to be drawn on the background. The synthesis unit 42 may synthesize various objects capable of being drawn as a video, by using the object data.

For example, in a case where the motion of the avatar according to the first stream and a background video according to the second stream are synthesized, the synthesis unit 42 may reproduce the motion of the avatar by using the avatar stored in advance and by using the retrieved motion, and may synthesize the avatar and the background video. Here, the synthesis unit 42 may include in advance information relevant to the avatar, and the synthesis unit 42 may have a function capable of reproducing the motion of the avatar by retrieving the motion information associated with the avatar. In this case, the motion is retrieved from the information source terminal, and is synthesized with the information of the avatar that is the basis of the motion stored in the synthesis unit 42, and thus, there is an advantage that it is possible to efficiently transmit the motion information of the avatar, compared to a case where the motion itself of the avatar is retrieved from the information source terminal as a video. In addition, the synthesis unit 42 may include information of one or a plurality of avatars, the one or the plurality of avatars may be stored by being respectively associated with motions based on one or a plurality of information source terminals. Accordingly, there is an advantage that it is possible to transmit the motion of the avatar by discriminating a motion retrieved from one information source terminal and a motion retrieved from the other information source terminal, and by using the avatars that are stored in the synthesis unit 42 by being associated with each of the motions.

In addition, a game may be used instead of the background video. In a case where the motion of the avatar according to the first stream and the game as the background video according to the second stream are retrieved by the acquisition unit 41, the synthesis unit 42 may reproduce the motion of the avatar by using the avatar stored in advance and the retrieved motion, and may synthesize the avatar and the game video. In this case, there is an advantage in which it is possible to reproduce a situation as if the game is broadcast live by the avatar.

In addition, for example, in a case where the information according to the gifting and a video to be subjected to moving image distribution are synthesized, there is an advantage that it is possible to reflect the information according to the gifting that is retrieved from various information source terminals on the video to be subjected to the moving image distribution, and it is possible for the information source provider according to the information source terminal to obtain a feeling of participating in the video though the gifting while efficiently transmitting information. That is, the first data type may include the information according to the gifting, and the second data type may include the video to be subjected to the moving image distribution, and the synthesis may include the reflection of the information according to the gifting on the video to be subjected to the moving image distribution.

Note that, by adopting a synthesis method of one stream and the other stream, there is an advantage that it is possible to set communication quality of each of the streams in accordance with the contents. For example, even in a case where the quality of a part of the stream according to the second data type that is the background video is impaired, it is possible to supplement the quality by using information that has been subjected to communication, and thus, the quality may not be high. On the other hand, the stream according to the first data type has significance in each of the information items, and thus, it is preferable that the quality is high. By adopting the synthesis method described above, there is an advantage that it is possible to provide appropriate synthesize information without obtaining excessive communication quality.

The information processing device executing a synthesis function of the synthesis unit 42 may be referred to as a "synthesis device". The synthesis device may be any of the server device, the information source terminal, and the user terminal.

That is, the synthesis may be performed by the server. In addition, the first stream may be retrieved from a first information source terminal, the second stream may be retrieved from a second information source terminal, and the synthesis may be performed by the first information source terminal or the second information source terminal. In addition, such synthesized data may be provided to one or a plurality of user terminals. In addition, the synthesis may be performed by the user terminal, and the synthesized data may be provided by the user terminal.

In addition, the first stream and the second stream that are retrieved from the first information source terminal may be synthesized by the first information source terminal and may be provided to one or a plurality of user terminals, may be synthesized by the server and may be provided to one or a plurality of user terminals, or may be synthesized by the user terminal and may be provided to the user terminal.

Figure 5:
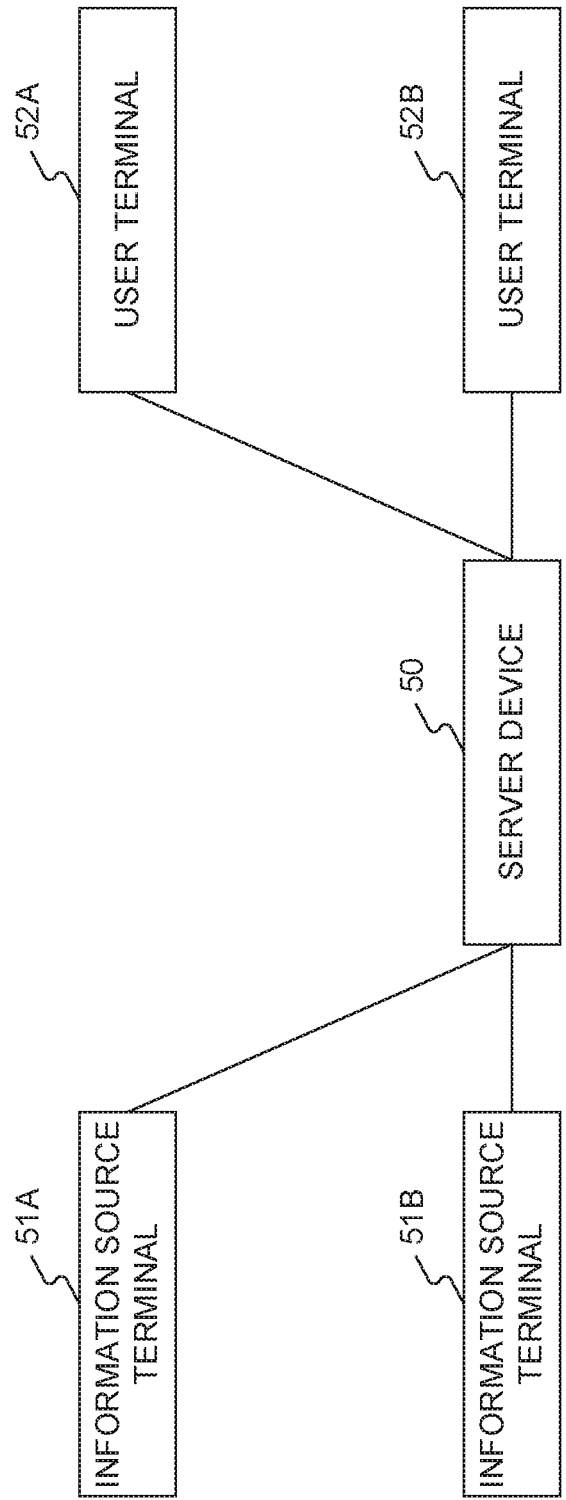
FIG. 5 is a block diagram illustrating an example of the configuration of the system according to one embodiment.
Figure 6:
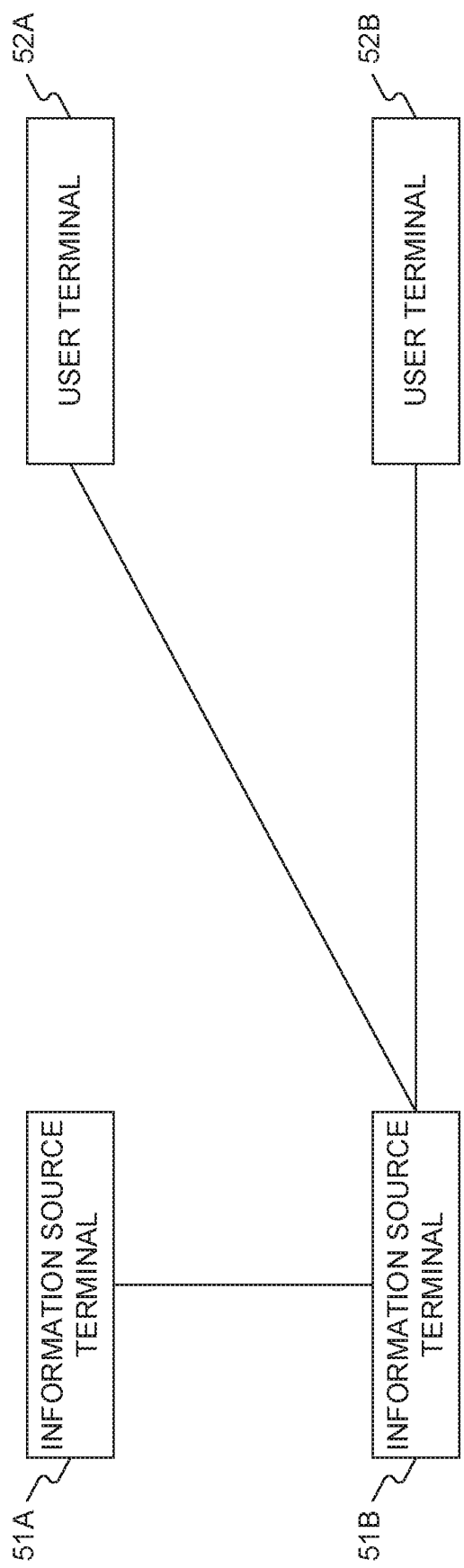
FIG. 6 is a block diagram illustrating an example of the configuration of the system according to one embodiment.
Figure 7:
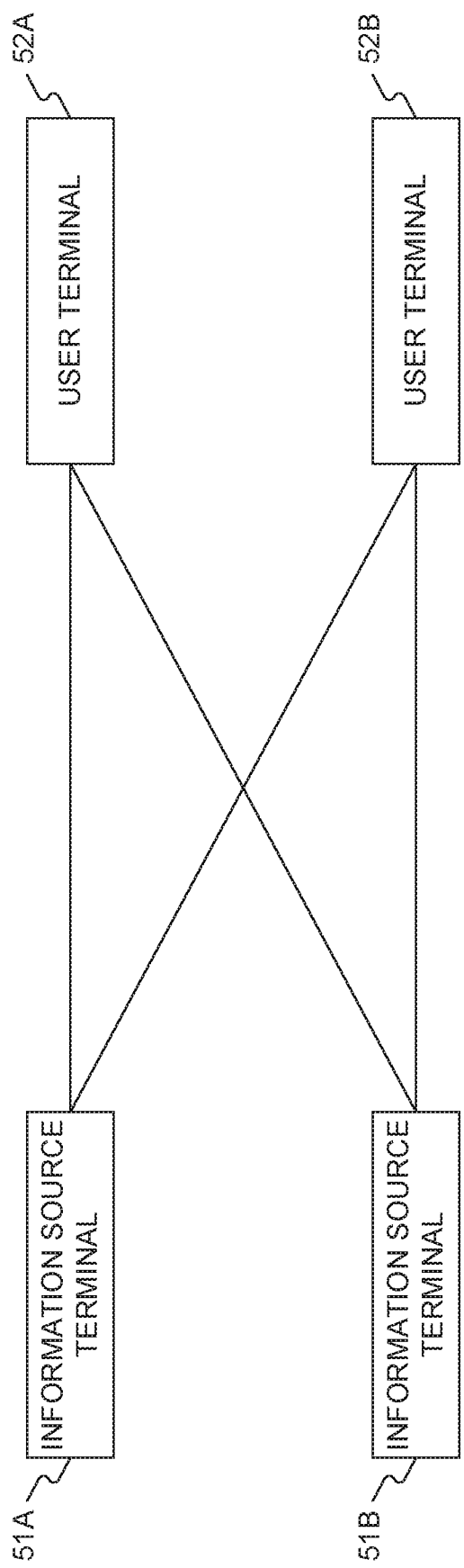
FIG. 7 is a block diagram illustrating an example of the configuration of the system according to one embodiment.

FIG. 5 to FIG. 7 illustrate the location of the information processing device in which a stream synthesis function of the synthesis unit 42 is performed, in accordance with pattern division described above. FIG. 5 illustrates a situation in which information or a stream retrieved from information source terminals 51A and 51B is synthesized in a server device 50, and is provided to user terminals 52A and 52B. FIG. 6 illustrates a situation in which the information or the stream retrieved from the information source terminals 51A and 51B is synthesized in the information source terminal 51B, and is provided to the user terminals 52A and 52B. FIG. 7 illustrates a situation in which the information or the stream retrieved from the information source terminals 51A and 51B is synthesized in the user terminal 52A, and is provided to the user terminal 52A, and is synthesized in the user terminal 52B, and is provided to the user terminal 52B.

Note that, the synthesis function of the synthesis unit 42 can be subjected to the pattern division as illustrated, but it is not necessary that the other function of the synthesis unit 42 is executed in the same information processing device as the synthesis function subjected to the pattern division, and the other function may be executed in the other information processing device. That is, the synthesis unit 42 may be executed in one or a plurality of information processing devices. For example, the first stream according to the first data type including the motion, the second stream according to the second data type including the video, and a third stream according to the first data type including the sound may be retrieved, the first stream according to the first data type including the motion and the second stream according to the second data type including the video may be synthesized in a first information processing device, the synthesis of the first stream and the second stream and the third stream according to the first data type including the sound may be provided to a second information processing device, the synthesis of the first stream and the second stream and the third stream may be synthesized in the second information processing device, and the synthesis may be provided to the second information processing device or a third information processing device.

In addition, as another aspect, the data according to the first stream of the first data type including the motion, the sound, the comment, or the information according to the gifting, which are retrieved, the data according to the second stream of the second data type including the video that is retrieved may be synthesized, and then, the third stream of the second data type may be retrieved from a terminal to which the first stream is provided, a terminal to which the second stream is provided, or the other terminal, and data according to the synthesized stream and data according to the third stream may be synthesized, or a fourth stream of the first data type may be retrieved from the terminal to which the first stream is provided, the terminal to which the second stream is provided, or the other terminal, and the data according to the synthesized stream and data according to the fourth stream may be synthesized.

In addition, FIG. 8 to FIG. 11 are sorts including data to be transmitted, in a synthesis aspect. Note that, in the drawings and the corresponding description, a portion illustrated as CDN (HLS) indicates an example using content delivery network (CDN), and then, using HTTP live streaming (HLS), but this is merely an example, and the portion may indicate an example in which CDN is used, but HLS is not used, an example in which HLS is used without using CDN, or other examples.

Figure 8:
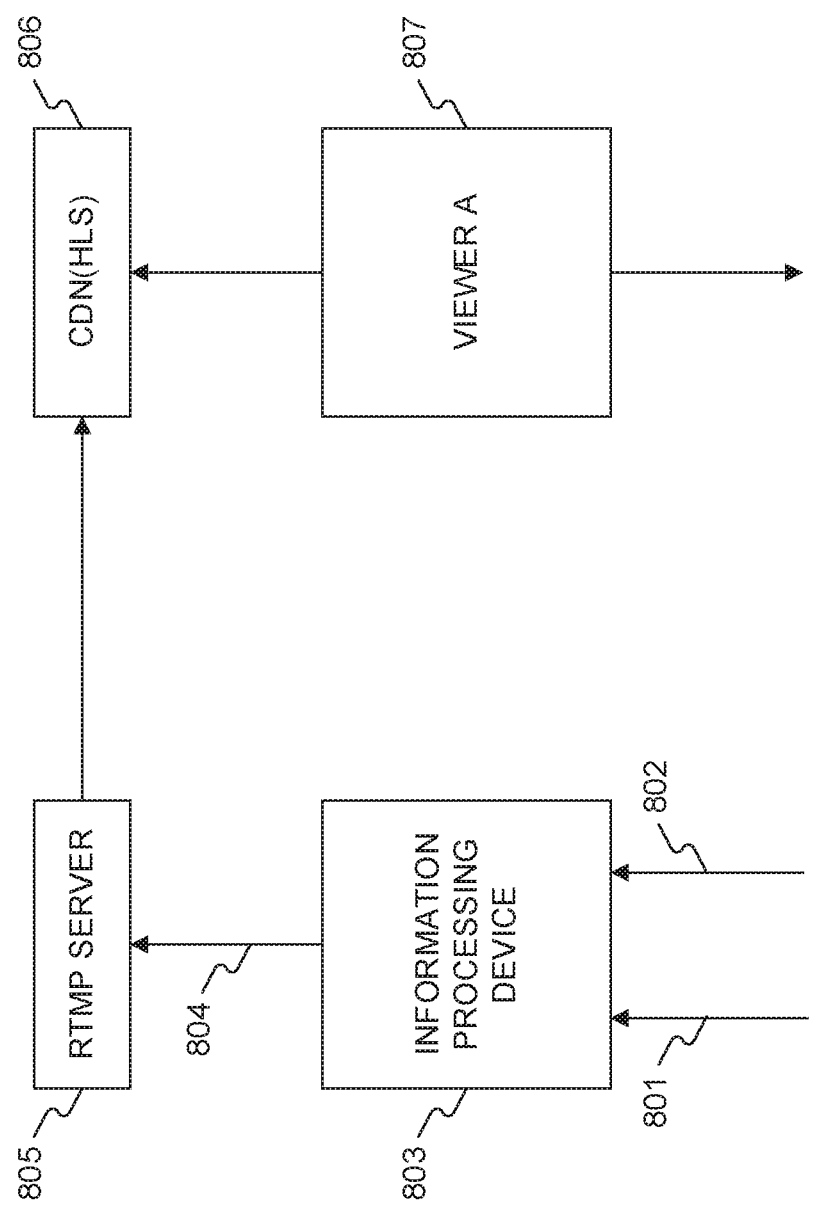
FIG. 8 is a block diagram illustrating an example of the configuration of the system according to one embodiment.

FIG. 8 is a configuration in which an information processing device 803 retrieves a sound 801 and a motion 802, synthesizes the sound and the motion with an avatar video corresponding to the motion in the information processing device 803, sends 804 the synthesis of the sound and the video to an RTMP server 805, the RTMP server 805 retrieves the synthesis, the RTMP server 805 sends the synthesis to CDN (HLS) 806, and the CDN (HLS) 806 distributes the synthesis to a viewer A 807. Here, the information processing device 803 may be the information source terminal, or may be the server device retrieving information from the information source terminal. In addition, the information processing device 803 may include open broadcaster software (OBS), or may retrieve information from the other information processing device by HDMI, AirPlay, or the like.

Figure 9:
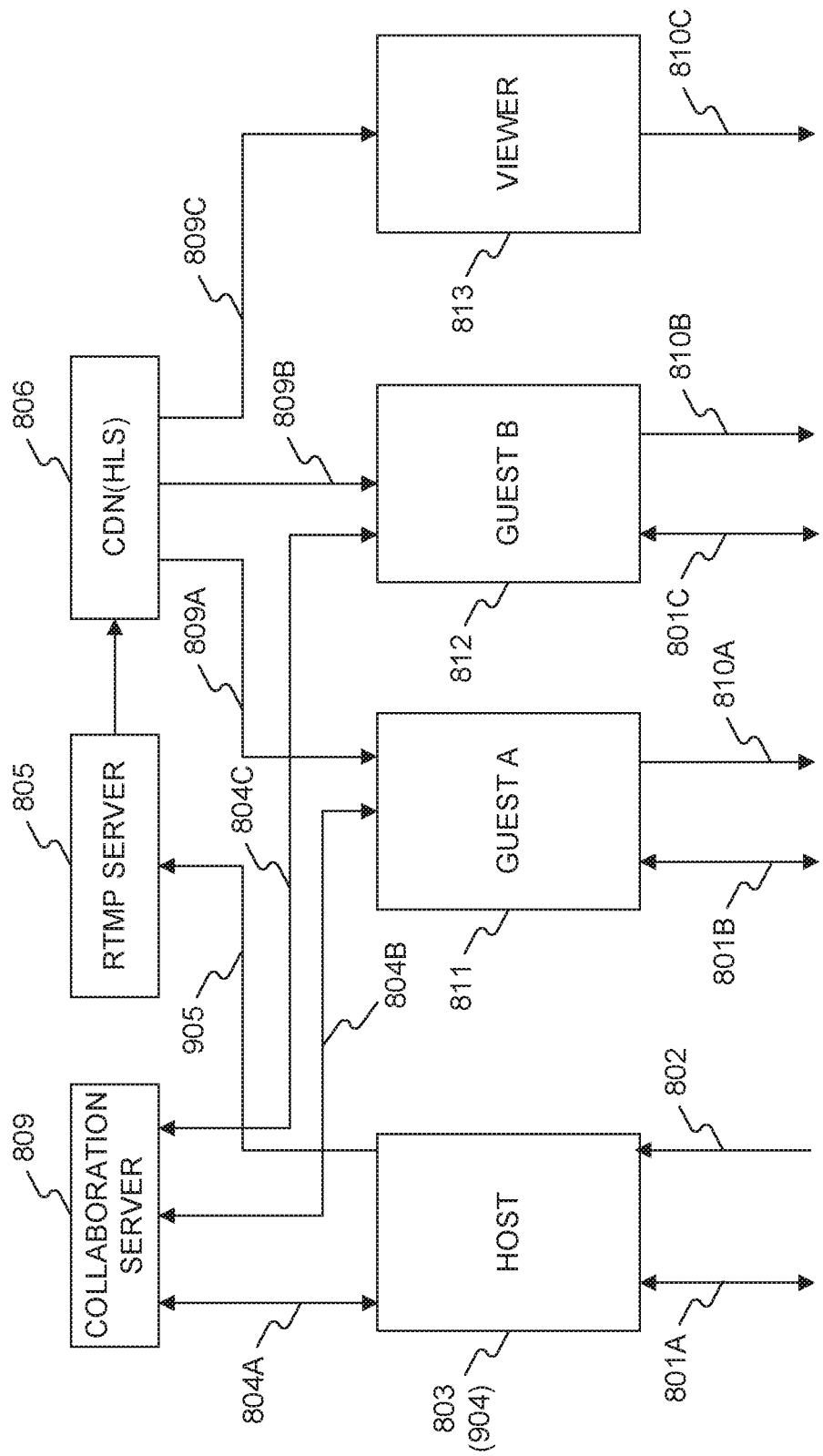
FIG. 9 is a block diagram illustrating an example of the configuration of the system according to one embodiment.

FIG. 9 illustrates that a host 904 that is the information processing device retrieves a sound 801A and the motion 802, synthesizes the sound and the motion with an avatar video corresponding to the motion in the information processing device 803, sends 905 the synthesis of the sound and the video, an RTMP server 805 retrieves the synthesis, the RTMP server 805 sends the synthesis to CDN (HLS) 806, and the CDN (HLS) 806 sends 809A the synthesis of the sound and the video to a guest A 811, sends 809B the synthesis to a guest B 812, and sends 809C the synthesis to a viewer 813. Here, the host that is the information processing device 803 may be the information source terminal, or may be the server device retrieving information from the information source terminal. The guest A 811 and the guest B 812 may be the information source terminal, and each of the information source providers may be capable of bidirectionally inputting/outputting a sound 801B and a sound 801C, and of viewing each of a video 810A and video 811B. In addition, the viewer 813 may be the user terminal, and may be capable of viewing the video 810C. The host 904, the guest A 811, and the guest B 812, which are the information processing device, may be capable of bidirectionally exchanging the sound with respect to a collaboration server 809 (804A, 804B, and 804C). Note that, in this drawing, two information processing devices of a guest A 811 and the guest B 812 are illustrated, but one information processing device may be provided, or two or more information processing devices may be provided. Similarly, one viewer 813 that is the information processing device may be provided, or two or more viewers 813 may be provided.

Figure 10:
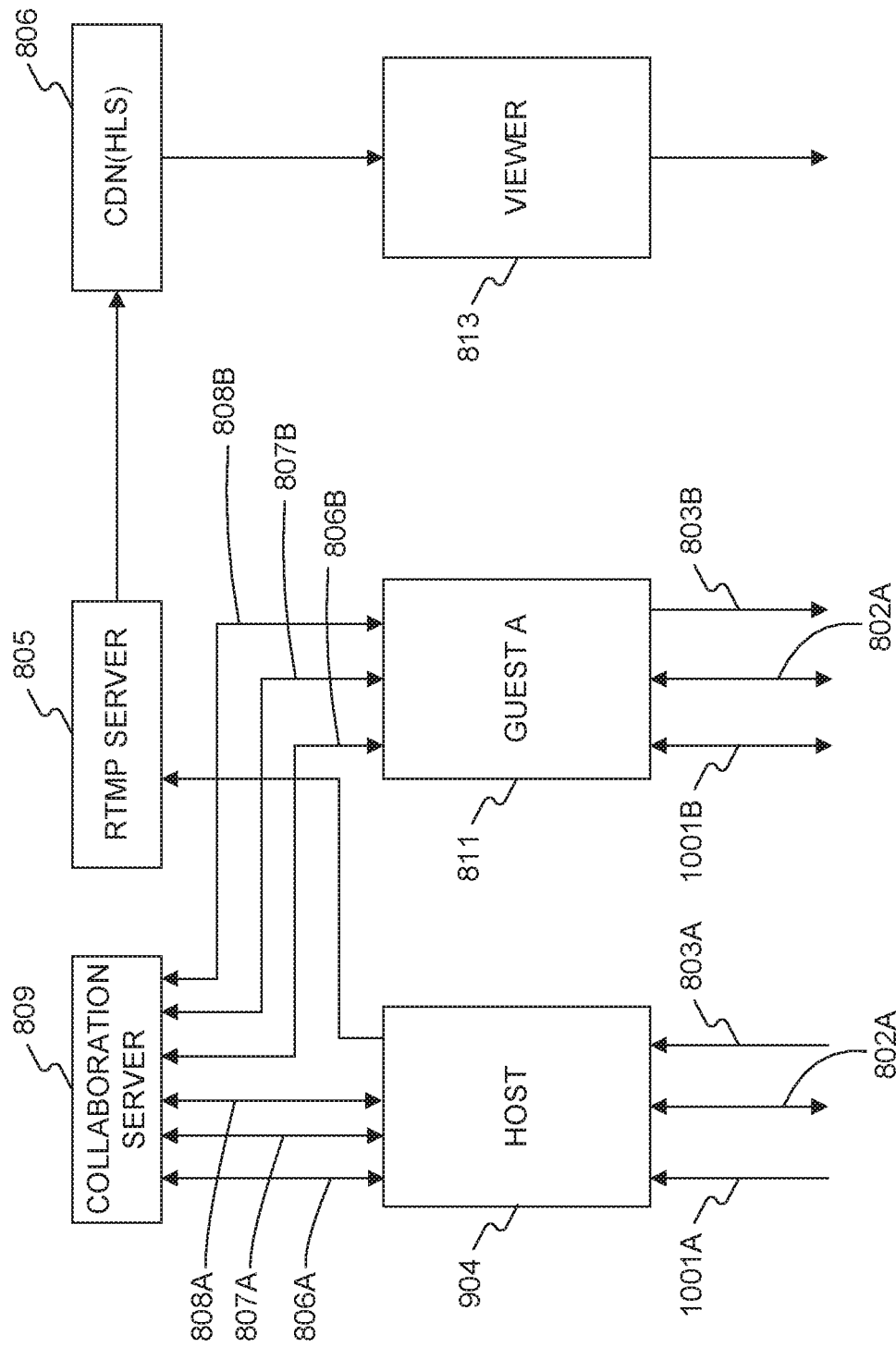
FIG. 10 is a block diagram illustrating an example of the configuration of the system according to one embodiment.

FIG. 10 illustrates that a host 904 that is the information processing device and a guest A 811 that is the information processing device may be configured to be capable of retrieving each of a motion 1001A and a motion 1001B, of bidirectionally inputting/outputting each of a sound 802A and a sound 802B, and of viewing each of a video 803A and a video 803B. The host 904 that is the information processing device may be configured to be capable of bidirectionally transmitting 806A a sound, of bidirectionally transmitting 807A a motion, and of bidirectionally transmitting 808A gifting information, with respect to a collaboration server 809. In addition, the guest A 811 that is the information processing device may be configured to be capable of bidirectionally transmitting 806B a sound, of bidirectionally transmitting 807B a motion, and of bidirectionally transmitting 808B gifting information, with respect to the collaboration server 809. In particular, the sound, the motion, and the gifting information, retrieved from the guest A 811 through the collaboration server 809, may be synthesized with the sound, the motion, and the gifting information, retrieved in the host 904, in the host 904, may be transmitted to the RTMP server 805, as a video, may be transmitted to the CDN (HLS) 806, and may be transmitted to the viewer 813. Note that, in this drawing, a transmission path of information from the host 904 to the guest A 811 through the collaboration server 809 is illustrated, but the transmission path is not limited thereto, and for example, similarly, information may be capable of being bidirectionally transmitted to a guest B, a guest C, a guest D, and the like, which have a function similar to that of the guest A and are not illustrated in the drawing, from the host 904 through the collaboration server 809. In addition, in this drawing, a transmission path of the information to the viewer 813 from the host 904 through an RTMP server 805 and the CDN (HLS) 806 is illustrated, but the transmission path is not limited thereto, and for example, information may be transmitted to the other one or a plurality of viewers having a function similar to that of the viewer 813 from the host 904 through the RTMP server 805 and the CDN (HLS) 806.

Figure 11:
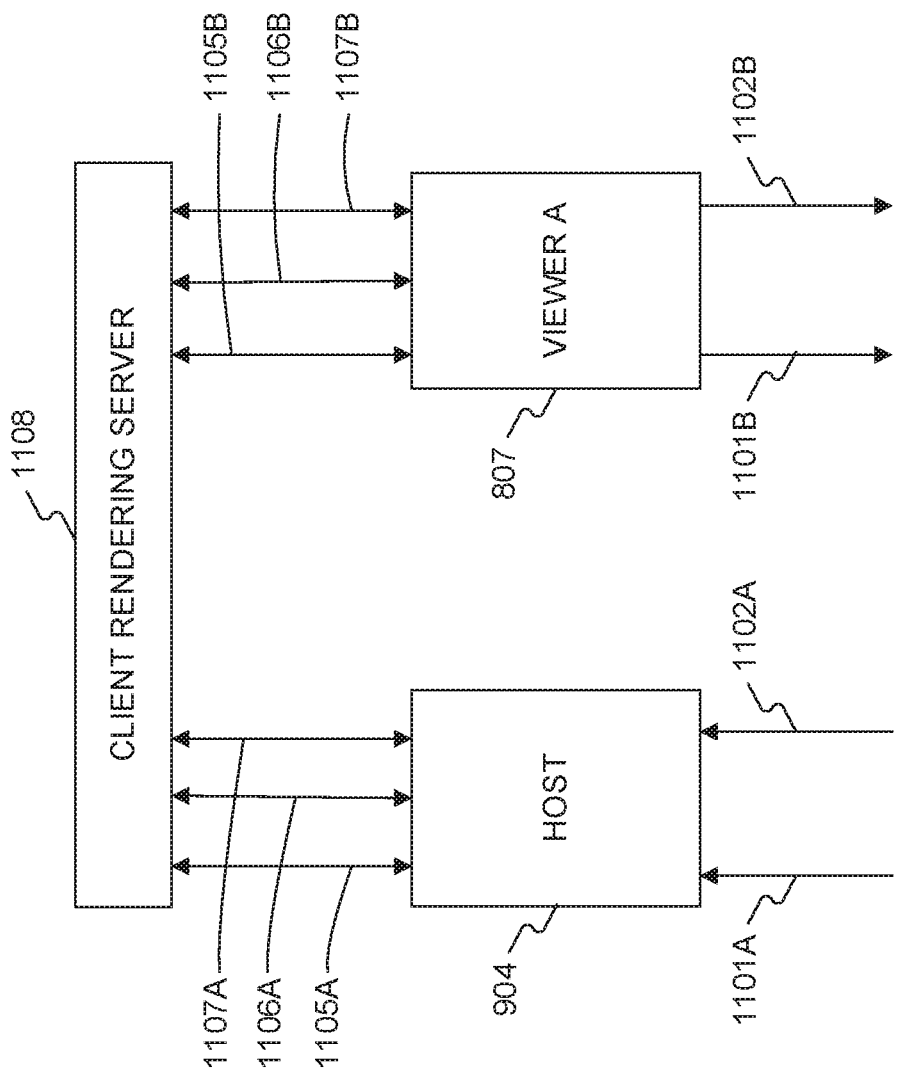
FIG. 11 is a block diagram illustrating an example of the configuration of the system according to one embodiment.

FIG. 11 illustrates that the host 904 that is the information processing device retrieves gifting information 1101A and a motion 1102A, and the host 904 that is the information processing device transmits a sound 1105A, gifting information 1106A, and a motion 1107A to a client rendering server 1108. The client rendering server 1108 transmits a sound 1105B, gifting information 1106B, and a motion 1107B to the viewer A 807 that is the information processing device, and in the viewer A 807 that is the information processing device, the sound and the motion are synthesized, and gifting information 1101B and a video 1102B are provided. Note that, in this drawing, a transmission path of information from the host 904 to the viewer A 807 through the client rendering server 1108 is illustrated, but the transmission path is not limited thereto, and for example, similarly, information may be capable of being bidirectionally or unidirectionally transmitted to a viewer B, a viewer C, a viewer D, and the like, which have a function similar to that of the viewer A and are not illustrated, from the host 904 through the client rendering server 1108.

In addition, as illustrated in each of the drawings described above, in the first stream and the second stream retrieved from one or a plurality of information source terminals, various combinations of the video and the sound may be synthesized. For example, it is considered that the first stream retrieved from the first information source terminal is a video, the second stream retrieved from the first information source is a sound, the third stream retrieved from the second information source terminal is a video, and the fourth stream retrieved from the second information source terminal is a sound. In this case, the synthesis unit 42 may synthesize all of the first stream to the fourth stream, or may synthesize a part of the first stream to the fourth stream. Specifically, the synthesis unit 42 may synthesize the first stream to the third stream, or may synthesize the first stream, the second stream, and the fourth stream. In addition, in the case of retrieving only the third stream from the second information source terminal without retrieving the fourth stream, the synthesis unit 42 may synthesize the first stream to the third stream, may synthesize the first stream and the third stream, or may synthesize the second stream and the third stream. In addition, in the case of retrieving only the fourth stream from the second information source terminal without retrieving the third stream, the synthesis unit 42 may synthesize the first stream, the second stream, and the fourth stream, may synthesize the first stream and the fourth stream, or may synthesize the second stream and the fourth stream. Note that, in the description of this paragraph, the stream is described as a video or a sound, but the stream may include both of the sound and the video.

Note that, this is an example, and it is obvious that other various synthesis aspects can be provided.

In addition, in a case where the acquisition unit 41 retrieves a plurality of streams, the synthesis unit 42 may perform temporal adjustment with respect to the plurality of streams. For example, in a case where one or a plurality of streams retrieved by the acquisition unit 41 respectively include temporal information such as a time stamp, the synthesis unit 42 may synthesize the stream by using time information of each of the streams such that a difference in the time information of each of the streams is less than or equal to a predetermined value. Note that, in a case where in first time information according to the first stream retrieved from the first information source terminal and second time information according to the second stream retrieved from the second information source terminal, a difference between the first time information and the second time information is greater than or equal to a predetermined value, one of the first time information and the second time information may not be synthesized and used, but only the other may be provided to the provision unit 44, in accordance with a communication situation. In this case, even in a case where the communication situation is impaired, there is an advantage that it is possible to continuously transmit constant information. Note that, in such a case, a method for supplementing the degradation of communication information by using an information amount may be used as a method for selecting information to be used and information not to be used.

That is, each of the first stream and the second stream may include the time information, and the synthesis unit 42 may be configured to be capable of adjusting the time information according to the first stream and the time information according to the second stream to have a predetermined relationship, and of synthesizing the first stream and the second stream. Note that, as the predetermined relationship, the time information items according to the streams to be synthesized may be synthesized by being adjusted to be identical to each other, or may be synthesized by being adjusted to be in a predetermined time. The reason of being in the predetermined time is that even in a case where a temporal error occurs in accordance with the type of information, the user may not have uncomfortable feeling at the time of browsing.

In addition, in a case where the intermediate information is retrieved, the synthesis unit 42 may perform synthesis by using the intermediate information. In addition, in a case where the intermediate information is retrieved, the synthesis unit 42 may determine whether or not to perform synthesis by using the intermediate information, and may perform the synthesis only in a case where it is determined to perform the synthesis. In this case, the synthesis may be prevented from being performed (e.g., the synthesis may not be performed) in a case where the synthesis is not necessary, and thus, there is an advantage that it is possible to efficiently perform processing. Examples of a case where it is determined that the synthesis is not necessary include a case where it is determined not to be displayed as information on the depth side by using the depth information. More specifically, for example, in the case of determining depth information of each of the depth of one of at least two information items, such as a moving image and an avatar and the depth of the other one, information on the near side but not the depth side may be used without being synthesized. Note that, in this case, two information items may be determined by using a display region on a video. For example, in a case where depth information according to a video 1 is A, depth information according to a video 2 is B, and B includes more depth information than A (that is, the video 1 may not be more visible than the video 2), when the video 1 is not covered by the video 2, the video 1 may be visible even in the case of being on the depth side from the video 2, and thus, the acquisition unit 41 may retrieve the video 1, and the synthesis unit 42 may perform the synthesis by using such a video 1. As described above, the display region of the video that can be synthesized may be used. The position of the display may be used as the display region.

In addition, the synthesis unit 42 may determine whether or not to perform the synthesis by using information of the control information management unit 43 described below, at the time of performing the synthesis, or may perform the synthesis without using the information of the control information management unit 43. In the former case, for example, in the information that is managed by the control information management unit 43, in a case where it is set such that information that is synthesized is provided to all of the user terminals, the synthesis may be performed, in a case where it is set such that information that is not synthesized is provided to all of the user terminals, the synthesis may not be performed, and in a case where it is set such that information that is synthesized is provided to one user terminal, and information that is not synthesized is provided to the other user terminal, the synthesis may be performed. Note that, in the last case, the provision unit 44 may provide the information that is synthesized to a user terminal to which it is set that the information that is synthesized is provided, or may provide the information that is not synthesized to a user terminal to which it is set that the information that is not synthesized is provided. Note that, as described below, the control information may be set for each of the user terminals with respect to each information item of a production, and thus, there may be various patterns of the information to be synthesized, and the pattern of the information to be synthesized may be set by using the information of the control information management unit 43. In this case, the pattern of the information to be synthesized is determined in accordance with a pattern to be synthesized, which is requested by the user terminal, and thus, there is an advantage that it is possible to efficiently perform synthesis processing.

In addition, the synthesis unit 42 may have a function of adjusting a frame rate of one or both of the first stream and the second stream to be synthesized before the synthesis. For example, the first stream that is distributed from the first information source terminal and the second stream that is distributed from the second information source terminal may have different distribution environments. A difference in the distribution environments may be according to the function of the information source terminal, or may be according to a communication situation of a network from each of the information source terminals. The synthesis unit has the function of adjusting the frame rate, and thus, there is an advantage that it is possible to generate synthesized data that is suitable for the function or the network situation of the information source terminal distributing the stream. The frame rate after the adjustment may be a high frame rate, or may be a low frame rate, compared to a frame rate set in advance or a frame rate defined in the stream that is retrieved by the synthesis unit. In addition, the frame rate may be a frame rate lower than a predetermined value set in advance.

In addition, the frame rate may be a frame rate lower than one or a plurality of predetermined values associated with the retrieved information amount of the stream to be synthesized. The retrieved information amount of the stream may be an information amount per unit, cumulative retrieved information amount not to be synthesized, or the like. In particular, in a case where there is a delay in the distribution of one stream, the synthesis is performed by adjusting a frame rate of one stream to be lower than the predetermined value, and thus, there is an advantage that even in a case where a frame rate is low, it is possible to provide a video having high image quality, but not an unstable stream having low image quality due to the delay. In this case, the synthesis unit 42 may synthesize one stream adjusted to have a frame rate lower than the predetermined value, and the other stream.

Further, the synthesis unit 42 may be configured to select data not to be synthesized and data to be synthesized in data of one or both of the first stream and the second stream to be synthesized, in accordance with the terminal, and to synthesize only the data to be synthesized. Here, the data not to be synthesized, for example, may be data that has been retrieved in the user terminal or data that is not necessary. In a case where the synthesis unit 42 has such a configuration, there is an advantage that it is possible to decrease the communication amount, and to accelerate a standby time.

In addition, various synthesis methods other than the synthesis methods described above may be used. For example, the synthesis may be performed by using a Chroma key technology, and masking used in the synthesis may be a method using a hue such as a Chroma key as a key. In addition, the synthesis may be performed by preparing an image memory for a mask such as an alpha mask, and by performing an arithmetic operation. In addition, a method for storing transparent information in a file, as with a PNG file, may be used. Here, the image memory to be the mask may store whether or not it is transparent by a binary value, or may use a halftone of 4 values to 256 values, in accordance with an arithmetic cost or image quality. In addition, the synthesis may be performed by simply overlapping at least two targets, and a hue or an image synthesis algorithm such as multiplication may be applied to one or both of at least two targets. Note that, in a case where one or both of the targets to be synthesized is a 3D video, the synthesis may be performed by using the depth information (a depth). Note that, each method described above is an example, and other general synthesis methods may be used.

3-3. Control Information Management Unit 43

The control information management unit 43 has a function of managing the control information. The information that is managed by the information management unit may be various information items, and for example, may be the viewpoint control information, the production control information, or the like. As illustrated in FIG. 12, the control information management unit 43 may store various information items, as the control information.

<Viewpoint Control Information>

The viewpoint control information is information for controlling the viewpoint of the user. The viewpoint control information may be setting of an initial value of the viewpoint of the user, setting of the movement of the viewpoint of the user, or the like. Therefore, for example, in a sports game or the like in which there are audiences (e.g., spectators) watching the game, it is possible to set the initial value of the viewpoint of the user by selecting one audience of a plurality of audiences, and it is possible to move to a viewpoint of one audience or to the other portion in the game that is not the audience by selecting the one audience of the plurality of audiences. That is, the control information management unit 43 may have a function of retrieving information according to a viewpoint in a game space from one user terminal, and of changing the viewpoint in the game space according to the one user terminal.

The viewpoint control information may include the information according to the viewpoint in the game space. The information according to the viewpoint in the game space may include information for specifying the user whose viewpoint is changed, and information for specifying a portion after the viewpoint is changed. The information for specifying the user whose viewpoint is changed may be an ID according to the user, or the like, or may be information for specifying a user terminal according to the user. The portion after the viewpoint is changed may be the viewpoint of the user participating in the game space, may be a viewpoint of a character appearing in the game space, or may be one portion in the game space. The viewpoint of the user participating in the game space may be specified by the ID, or may be specified by a user name that is available in the game, or the like. In addition, similarly, the character appearing in the game space may be specified by a character name, or one portion in the game space may be information capable of specifying one portion in the game space. Examples of the character appearing in the game space include an audience in the case of a competition such as a sports game. The vision of the game is different in accordance with the position of the audience, and thus, there is an advantage that it is possible for more users to have new interest in the game, by enabling the viewpoint to be moved. In addition, other characters in the game, which is not the audience, may be people associated with the game, such as a referee of the game, a commentator of the game, a player waiting for participating in the game, and a player playing in a game stage, and in addition to the above, may be one point or region in the game space, such as the center of the game stage, the upper center of the game stage, a ceiling camera, and the back of the goal post. In addition, in a game other than the competition such as the sports game, a target to which the viewpoint is moved may be set in a player appearing in the game or one point or region in a specific game space. In a case where it is possible to move to the viewpoint of the people associated with the game, there is an advantage that it is possible to enjoy the game in the viewpoint of the people associated with each of the games, and in the case of one point or region in the game space, there is an advantage that it is possible to enjoy the game from a viewpoint that is not capable of being usually seen. That is, the control information management unit 43 may change a viewpoint in a game space according to one user terminal to a viewpoint in a game space according to any one user of user terminals set in advance, or may change the viewpoint in the game space according to the one user terminal to a viewpoint of one location in a game space other than the user terminal set in advance.

The viewpoint control information may be information capable of specifying the people associated with the game described above, or may be information capable of specifying one point or region in the game space.

In this case, the control information management unit 43 may have a function of storing in advance options of the position of the viewpoint of the audience according to the game or a position capable of providing the viewpoint in the game space. In addition, the control information management unit 43 may transmits such options to one or a plurality of user terminals. In addition, in the user terminal, one or such options may be capable of being selected, or one selected option may be provided to the control information management unit 43. In addition, the control information management unit 43 may retrieve, store, and set the one selected option.

In addition, the control information management unit 43 may set the viewpoint by using the viewpoint control information and a predetermined condition. For example, in a case where the viewpoint is moved to a viewpoint of people associated with a specific game, one point or region in the game space, one predetermined point or region in the game space, the viewpoint can be set only in the case of satisfying a predetermined condition. Such a predetermined condition may be set in advance, and the control information management unit 43 may store in advance the condition. In addition, in a case where the acquisition unit 41 retrieves the viewpoint control information from the user terminal, the control information management unit 43 may have a function of determining whether or not the viewpoint control information satisfies the condition. Then, in a case where the viewpoint control information satisfies the condition, the control information management unit 43 may move and set the viewpoint, but in a case where the viewpoint control information does not satisfy the condition, the viewpoint may not be set.

The predetermined condition, for example, may indicate that a user who wants to change the viewpoint has a predetermined item, obtains a predetermined evaluation point, is in a predetermined rank, has a predetermined viewing time, provides a predetermined valuable product, or provides a predetermined amount of predetermined valuable parts.

In a case where having the predetermined item is included as the condition, there is an advantage that the user who wants to change the viewpoint is motivated to retrieve such a predetermined item. In addition, in a case where obtaining the predetermined evaluation point or being in the predetermined rank is included as the condition, there is an advantage that the user who wants to change the viewpoint is motivated to obtain such an evaluation point or such a rank. Here, the evaluation point may be obtained by obtaining points or the like in the game, and the rank may be a status that can be obtained by obtaining points or the like in the game. In addition, the predetermined viewing time may be as described below. In addition, the valuable product may be a product that is regarded as valuable in the game space. Being valuable may indicate that the product has a merit to be retained, and may be an item, a score in the game or in the game space, or the like.

In a case where the predetermined condition as described above is defined, the control information management unit 43 may determine the success and failure of the condition by using information associated with the predetermined condition described above, which is associated with a user terminal according to the user who wants to change the viewpoint. The information associated with the predetermined condition may be stored in the user terminal according to the user who wants to change the viewpoint, or may be stored in the control information management unit 43. In the former case, control information management unit 43 may inquire the user terminal described above, and the control information management unit 43 may retrieve information in which the success and failure of the condition is determined in the user terminal, or the control information management unit 43 may inquire the user terminal described above, may retrieve information necessary for determining the success and failure of the condition retrieved from the user terminal, and then, may determine the success and failure of the condition. Here, the information necessary for determining the success and failure of the condition may be an item, an evaluation point, a rank, a viewing time, a valuable product, and the like of the user. In addition, the control information management unit 43 may determine the success and failure of the condition by using the item, the evaluation point, the rank, the viewing time, the valuable product, or the like, stored in the control information management unit 43, in association with the user who wants to change the viewpoint. For example, the control information management unit 43 may be configured such that a change to the viewpoint of one location in the game space other than the user terminal set in advance is performed in a condition of providing the predetermined valuable product.

<Production Control Information>

The production control information is information for controlling a production that is output by the output device in the user terminal. Examples of the production include a sound, a comment, gifting, and the like, and thus, examples of the corresponding production control information include sound control information, comment control information, gifting control information, and the like. Note that, in this specification, the information source provider may indicate a person performing the production, the user may indicate a person viewing that the production is output, and the user terminal may indicate a terminal including the output device outputting the production.

The production control information may include grouping information. The grouping information may be information according to group division in a case where the user or the information source provider is subjected to group division. The information according to the group division may be information relevant to which group of a plurality of groups one user or one information provider belongs to. For example, in a case where there are five users of a to e, and there are two groups of A and B, as a group, the information according to the group division may be information indicating that a, b, and e belong to a group A, and c and d belong to a group B. In this case, a may be associated with A, b may be associated with A, e may be associated with A, c may be associated with B, and d may be associated with B. Here, an example of two groups of A and B has been described, but such an example is not limited to an example of a game such as soccer or baseball in which two teams compete, and in a game that is performed by being divided, the case of being a player or an audience, or the like is considered. In addition, in the case of being divided into three or more groups, a race game of three or more teams, or the like may be considered, and in the game in which two teams compete, described above, the group may include a referee, an audience, or the like. Note that, as the grouping information, a plurality of users may belong to one group, or one user may belong to one group. In addition, it has been described as the user, and the same may apply to the information source provider. In addition, a group of the user and a group of the information source provider may be provided, or a group in which the user and the information source provider are mixed may be provided.

Hereinafter, for convenience of description, a terminal to which the production is provided or a terminal to which the production is not provided will be described as the user terminal, but the user terminal may be one or a plurality of user terminals that are grouped as described.

The production control information may include information for setting whether or not to provide a sound, a comment, or information according to gifting, based on one specific user terminal, to the other specific user terminal. In the case of the setting in which the sound, the comment, or the information according to the gifting are not provided to the other specific user terminal, there is an advantage that it is possible for one specific user to provide various productions without being known to the user according to the other specific user terminal, and there is an advantage of further expanding the range of the game.

For example, the sound control information may include information for specifying a user terminal to which a sound is not provided or information for specifying a user terminal to which a sound is provided. In this case, it is possible to specify a user terminal to which sound information is not provided or a user terminal to which sound information is provided, and thus, there is an advantage of further expanding the range of the game. More specifically, in a case where the production control information is the sound control information, and is information for specifying a user terminal A as a target user terminal to which the sound information is not provided, when such production control information is set, the sound information may not be provided to the user terminal A.

In addition, the sound control information may include information for specifying an information source terminal that is an information source of a sound. In this case, there is an advantage that a sound to be provided or a sound not to be provided can be set in accordance with the information source terminal. More specifically, in a case where the production control information is the sound control information and is information for specifying the user terminal A as a target user terminal of the sound information that is not provided, and the information source terminal of the sound that is not provided is an information source terminal X, when such production control information is set, sound information retrieved from an information source terminal Y may be provided to the user terminal A, but sound information retrieved from the information source terminal X may not be provided to the user terminal A.

Similarly, instead of the sound control information described above, the comment control information and the gifting control information may include the corresponding information, and each corresponding information processing may be executed.

As described above, the information according to the gifting, the sound, or the comment with predetermined setting based on one or a plurality of specific information source terminals may not be provided to the other one or a plurality of specific user terminals. In addition, the predetermined setting may be performed by control information based on one user terminal.

In addition, the production control information described above may include information associated with the grouping information. In a case where the production control information includes information associated with the grouping information according to the user terminal to which the information is provided or not provided, and the production control information is associated with the grouping information, there is an advantage that it is possible to specify the user terminal in which it is set whether or not the information is provided, with respect to the sound, the comment, or the information according to the gifting, as a group. In addition, similarly, in a case where the production control information includes information associated with the grouping information according to the information source terminal that is the information source, and the production control information is associated with the grouping information, there is an advantage that it is possible to specify the information source terminal that is the information source with respect to the sound, the comment, or the information according to the gifting, as a group.

For example, in a case where the production control information is the sound control information, and is information for specifying a group of user terminals A and B as the target user terminal of the sound information that is not provided, when such production control information is set, the sound information may not be provided to the user terminals A and B. In addition, in a case where the production control information is the sound control information, and is the information for specifying the group of the user terminals A and B as the target user terminal of the sound information that is not provided, and the information source terminal of the sound that is not provided is the information source terminal X, when such production control information is set, the sound information retrieved from the information source terminal Y may be provided to the user terminals A and B, but the sound information retrieved from the information source terminal X may not be provided to the user terminals A and B.

Similarly, instead of the sound control information described above, the comment control information and the gifting control information include the corresponding information, and each corresponding information processing may be executed.

In addition, the production control information described above may be set on the basis of the designation of the information source terminal performing the production, or may be set on the basis of the designation of the user terminal to which the production is provided. In the former case, for example, the production control information indicating that information according to gifting performed by X is not provided to a terminal according to a user Y is retrieved from an information source terminal according to X performing the gifting. In this case, as described above, there is an advantage that it is possible to perform gifting with respect to an information source provider X, without being known to the user Y.

In addition, in the latter case, for example, the production control information indicating that a sound based on the information source provider X is not provided to the user terminal according to the user Y is retrieved from the user terminal according to the user Y. In this case, the user Y does not hear the sound from the information source provider X, and thus, there is an advantage that it is possible to use the latter case, for example, in a case where the user Y wants to ignore the sound from the information source provider X in which the user Y does not have an interest.

In addition, the control information management unit 43 may store information for determining the degree of production in the case of the production described above. For example, as the degree of production, in a case where the production is a sound, a sound volume of the sound may be stored, in a case where the production is a comment, the size, the color, and the type of font according to a text of the comment, a display position of the comment, and the like may be set and stored, and in a case where the production is information according to gifting, a production method at the time of performing the gifting may be stored.

In addition, the control information management unit 43 may include one or a plurality of information items relevant to the degree of production described above, with respect to each of the sound, the comment, and the gifting. In addition, in a case where the control information management unit 43 includes information relevant to the degree of a plurality of productions, with respect to each of the sound, the comment, and the gifting, the control information management unit 43 may determine and provide the degree of each of the productions in the case of performing the production, on the basis of a predetermined condition.

For example, the predetermined condition for determining the degree of each of the productions may be a viewing time, the position of the information source provider and the user in the game space, the presence or absence of the payment of a valuable product, the amount of valuable products, or a combination thereof. Such conditions may be referred to as "user attribute".

The viewing time may be the length of a time for which an information source provider according to the production is viewing an application that is a target. Such a viewing time may be the total time for which the application that is the target has been watched from the start of the use, or may be the total time for which the application has been viewed from a time point of performing re-login in the case of performing logout with respect to the application that is the target. In the former case, there is an advantage that the production is determined on the basis of the total time with respect to the application, and in the latter case, there is an advantage that the production is determined on the basis of the total time from the login. Note that, the viewing time may be the length of a time for which the user on a side viewing the production is viewing the application that is the target, as described above.

In addition, in a case where the degree of each of the productions is based on the viewing time, one user may depend on the length of the time for which the user is viewing the application that is the target. For example, in a case where the production is a cheer, when the user A is viewing the application for 5 hours, and a user B is viewing the application for 20 hours, a sound volume of the cheer of the user B may be set to be higher than a sound volume of the cheer of the user A. In addition, in a case where the production is a comment, similarly, when the user A is viewing the application for 10 hours, and the user B is viewing the application for 100 hours, a font size of the comment of the user B may be set to be larger than a font size of the comment of the user A. In addition, in a case where the production is gifting, similarly, when the user A is viewing the application for 20 hours, and the user B is viewing the application for 200 hours, the gorgeousness of the production of the gifting of the user B may be set to be more elaborate than the gorgeousness of the production of the gifting of the user A (for example, the gifting of the user A is more displayed than the gifting of the user B).

In addition, the degree of each of the productions depends on a relationship between the position of the information source provider performing an action to be produced, such as a sound, a comment, and gifting, in the game space (in this specification, the position may be referred to as an "information source position"), and the position of the user viewing the production in the game space (in this specification, the position may be referred to as a "viewing position"). Such a relationship may be a distance between the information source position and the viewing position, or may be the presence or absence of a shielding material between the information source position and the viewing position or the degree of shielding of the shielding material.

For example, in a case where the production is a cheer, a distance between an information source position according to the information source provider X who cheers and a viewing position according to the user A who hears the cheer may be a first distance, a distance between the information source position according to the information source provider X and a viewing position according to the user B who hears the cheer may be a second distance, and in a case where the second distance is longer than the first distance, a sound volume of the cheer set in a user terminal according to the user B may be set to be higher than a sound volume of the cheer set in the user terminal according to the user A.

Similarly, in a case where the production is a cheer, the distance between the information source position according to the information source provider X who cheers and the viewing position according to the user A who hears the cheer may be the first distance, a distance between an information source position according to an information source provider Y who cheers and the viewing position according to the user A who hears the cheer may be the second distance, and in a case where the second distance is longer than the first distance, in the user terminal according to the user A, a sound volume of the cheer that is set as the cheer from the information source provider X may be set to be higher than a sound volume of the cheer that is set as the cheer from the information source provider Y.

In addition, in a case where the production described above is a cheer, the degree of sound volume of the cheer may be determined in accordance with the distance between the information source position and the viewing position. For example, in a case where the distance between the information source position and the viewing position is doubled, the degree of sound volume of the cheer may be calculated by an arithmetic operation using a double-constant.

In addition, even in a case where the production is a comment, as described above, in a viewing terminal according to the viewing position, the font of the comment may be set in accordance with the relationship between the information source position and the viewing position.

In addition, similarly, in gifting, in the viewing terminal according to the viewing position, the gorgeousness of the production of the gifting may be set in accordance with the relationship between the information source position and the viewing position. In the gorgeousness of the production, for example, a plurality of degrees of gorgeousness of the production are set in advance, and in the plurality of degrees, one degree of gorgeousness of the production may be set.

In addition, the degree of each of the productions may be according to the presence or absence of the payment of the valuable product, a payment amount of the valuable product, or the like. As described above, the valuable product may have a value in the game space. Being valuable may indicate that the product has a merit to be retained, and may be an item, a score in the game or in the game space, or the like.

For example, the user pays for a predetermined valuable product, and thus, it may be possible to increase the degree of production with respect to a sound, a comment, and gifting. In this case, the production control information may include information indicating a specific production such as a sound, a comment, and gifting, information indicating one user terminal, and information for paying for a predetermined valuable product. By such information, a predetermined value is paid for the specific production based on the one user terminal, and thus, the control information management unit 43 is capable of retrieving an increase in the degree of production, and the degree of production may be set on the basis of such production control information.

In addition, similarly, the production control information may include information indicating a specific production such as a sound, a comment, and gifting, information indicating one user terminal, information for paying for a predetermined valuable product, and the amount of valuable product to be paid. By such information, a predetermined value with respect to the amount of valuable product is paid for the specific production based on the one user terminal, the control information management unit 43 is capable of retrieving an increase in the degree of production, and the degree of production may be set on the basis of the production control information.

Note that, as described above, the production control information may be set for each type of production, for example, each type of sound, comment, and gifting, or may be set with respect to all productions. In the latter case, each of the productions is treated as one setting, and thus, there is an advantage that the setting is facilitated.

As described above, a sound or a comment may be provided in accordance with the user attribute associated with one user terminal. The sound or the comment may be provided to an extent according to the user attribute associated with one user terminal, the user attribute may include a viewing period, the user attribute may include a location in the game space, and the user attribute may include the presence or absence of the provision of the valuable product or the degree of provision.

In addition, the production control information may include contents that are set such that a production in one user terminal is different from a production in the other user terminal. As an example of different productions, a gifting target may be set to be larger than that in the other user terminal, and may be displayed on one user terminal, or a sound that is generated as the production may be set to be higher than that in the other user terminal. In this case, only in a case where one user terminal has an arithmetic function or a storage function higher than those of the other user terminal, the productions may be set to be different. In this case, in a case where the information is not retrieved from the user terminal, as the production control information, the productions may be set to be different in a case where the arithmetic function or the storage function of the user terminal are higher than a predetermined value. In addition, in this case, information of the arithmetic function or the storage function of the user terminal may be retrieved in advance by the system from the user terminal, and information of different productions may be provided to the user terminal, on the basis of such information. That is, a production based on the one synthesize data that is provided in one user terminal may be different from a production based on the one synthesize data that is provided in the other user terminal.

3-4. Provision Unit 44

The provision unit 44 has a function of providing one that is generated by the synthesis unit 42. In addition, the provision unit 44 may provide one that is generated by the synthesis unit 42 or is retrieved by the acquisition unit 41 without being generated by the synthesis unit 42, on the basis of the information in the control information management unit 43.

The provision may be display or provision in a display device that is directly connected to an information processing device executing synthesis processing, or may be display or provision in a display device that is not directly connected to the information processing device executing the synthesis processing. In the former case, in the information processing device including the synthesis unit 42, the synthesized information may be provided, and in the latter case, in an information processing device different from the information processing device including the synthesis unit 42, the synthesized information may be provided.

4. FLOW OF INFORMATION PROCESSING ACCORDING TO EMBODIMENT

4-1. First Embodiment

Figure 13:
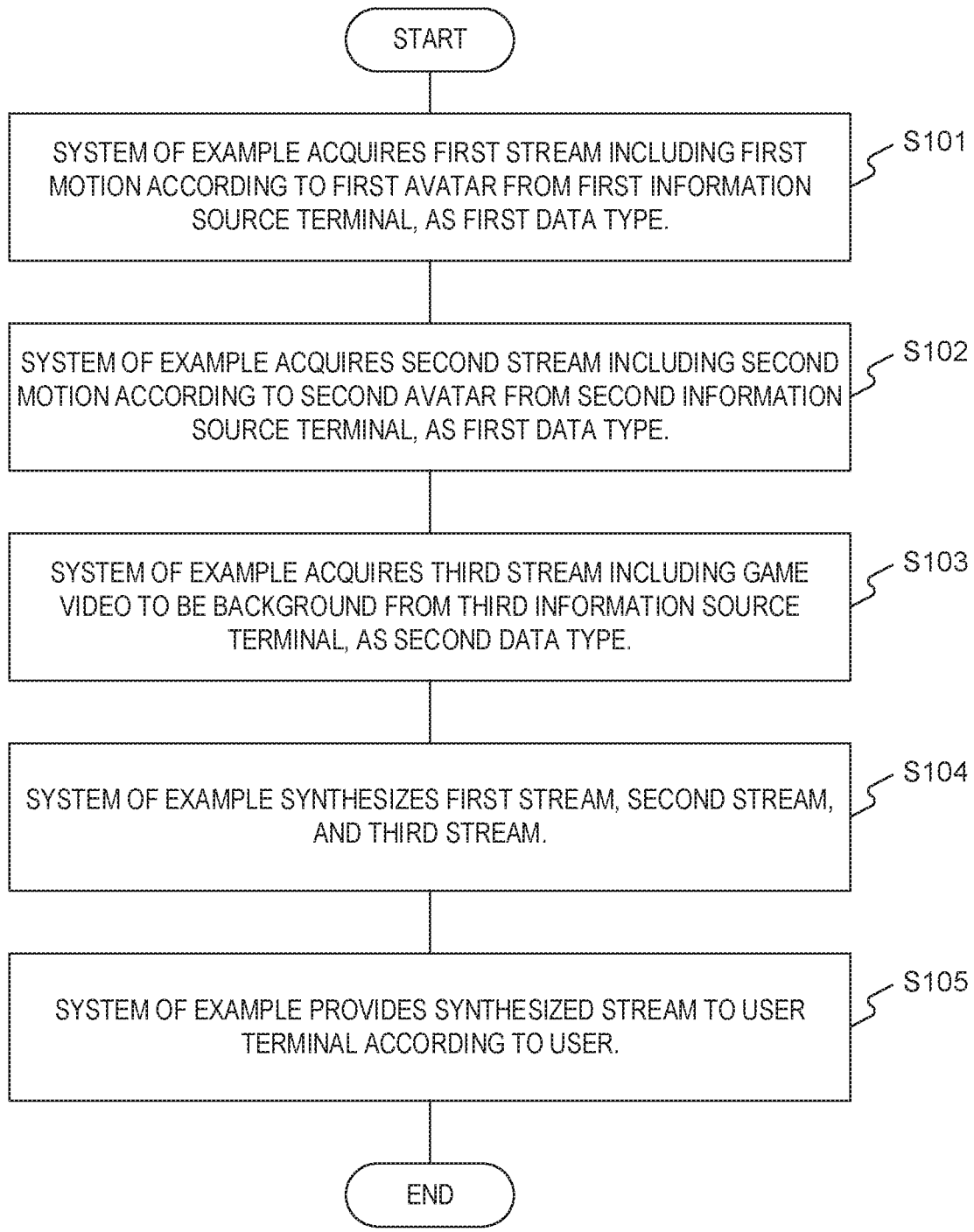
FIG. 13 is an example of a flow that is processed by the system according to one embodiment.

Next, a flow of information processing according to a first embodiment that is one aspect of the present disclosure will be described by using FIG. 13. In a system according to the aspect described in the first embodiment, a situation in which a first information source provider according to the first information source terminal is a first avatar, a second information source provider according to the second information source terminal is a second avatar, a game video is sent from a third information source terminal, and the viewer is viewing that the avatars and the game video are synthesized is set as a target.

Step 1

The system of an example retrieves the first stream including a first motion according to the first avatar from the first information source terminal, as the first data type (step S101). Here, the system of an example may include information of a video relevant to a specific character with respect to the first avatar.

Step 2

The system of an example retrieves the second stream including a second motion according to the second avatar from the second information source terminal, as the first data type (step S102). Here, similarly, the system of an example may include information of a video relevant to a specific character with respect to the second avatar.

Step 3

The system of an example retrieves the third stream including a game video to be the background from the third information source terminal, as the second data type (step S103).

Step 4

The system of an example synthesizes the first stream, the second stream, and the third stream (step S104). At this time, the constituent of the first avatar that is stored in the system of an example and the motion according to the first avatar in the first stream may be synthesized such that first avatar has a motion, and then, the first stream may be synthesized with the other stream. Similarly, the constituent of the second avatar that is stored in the system of an example and the motion of the second avatar in the second stream may be synthesized such that the second avatar has a motion, and then, the second stream may be synthesized with the other stream. In addition, such a synthesis order may be any order.

Step 5

The system of an example provides the synthesized stream to the user terminal according to the user (step S105).

4-2. Second Embodiment

Figure 14:
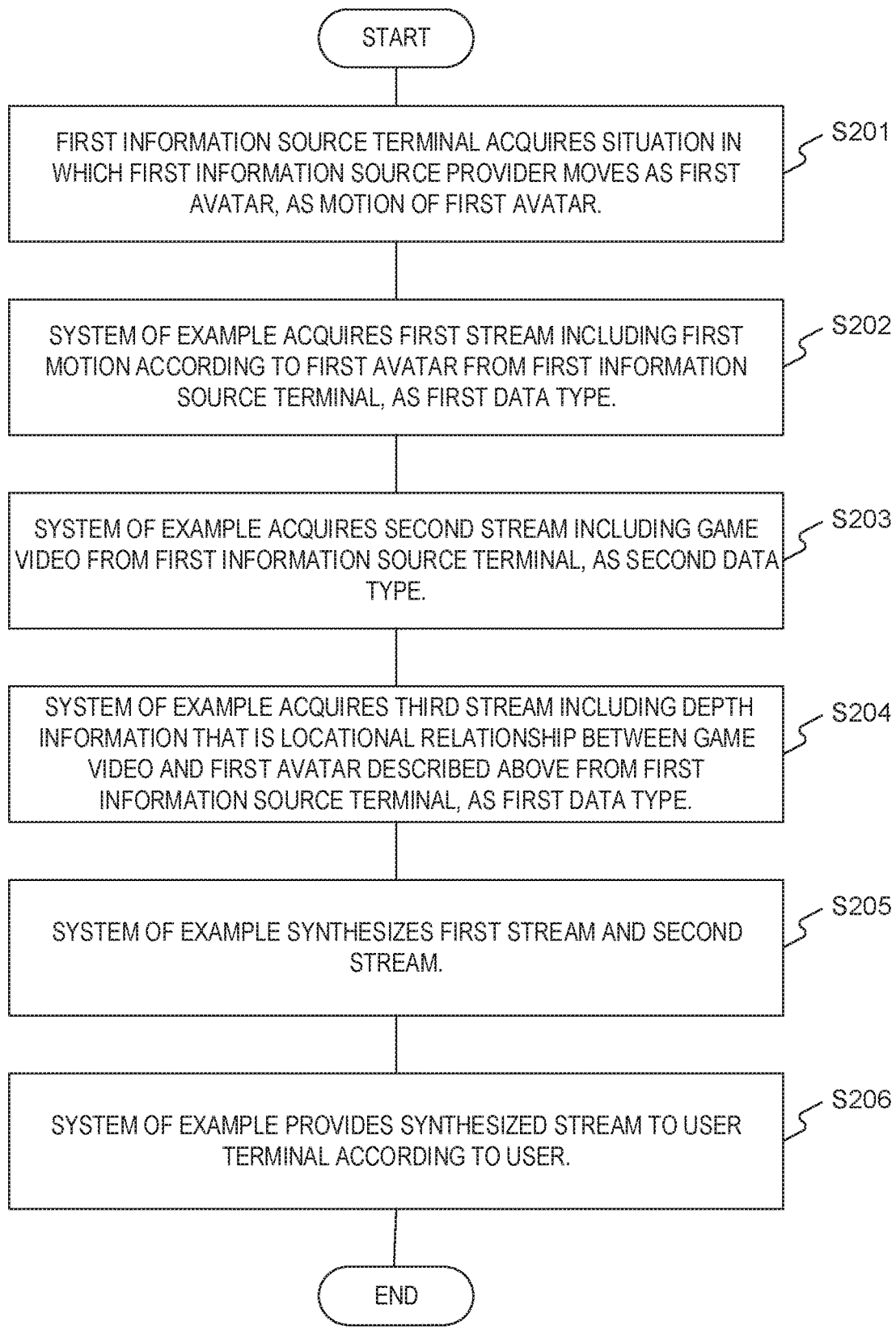
FIG. 14 is an example of the flow that is processed by the system according to one embodiment.

Next, a flow of information processing according to a second embodiment that is one aspect of the present disclosure will be described by using FIG. 14. In a system according to an aspect described in the second embodiment, a situation in which the first information source provider is the first avatar, the first information source terminal retrieves a motion and a game video according to the first information source provider, and the viewer is viewing that the avatar, the motion, and the game video are synthesized is set as a target. Note that, as a locational relationship between the game video and the first information source provider, the system of an example retrieves the depth information as the intermediate information.

Step 1

The first information source terminal retrieves a situation in which the first information source provider moves as the first avatar, as the motion of the first avatar (step S201). The first information source terminal may retrieve a motion as the motion of the first information source provider through a sensor mounted on the body of the first information source provider, or may retrieve the motion by analyzing the imaging device imaging the motion of the first information source provider.

Step 2

The system of an example retrieves the first stream including the first motion according to the first avatar from the first information source terminal, as the first data type (step S202). Note that, the system of an example may include the information of the video relevant to the specific character with respect to the first avatar.

Step 3

The system of an example retrieves the second stream including the game video from the first information source terminal, as the second data type (step S203). Note that, a situation is considered in which the first information source provider broadcasts live, for example, a game, in front of the game video.

Step 4

The system of an example retrieves the third stream including the depth information that is the locational relationship between the game video and the first avatar from the first information source terminal, as the first data type (step S204). Here, the depth information may be a set of depth information of the first avatar and depth information of the game video, or may be differential information of the depth information of the game video and the depth information of the first avatar. In addition, in the latter case, information indicating which is the front may be added.

Step 5

The system of an example synthesizes the first stream and the second stream (step S205). Here, the synthesis unit 42 may perform the synthesis by using the depth information included in the third stream. For example, a case is considered in which the first information source provider moves around behind the game video during the live broadcast of the game or moves to the front. In a case where the avatar that is played by the first information source provider moves around behind the game video, the avatar disappears from the game video, and thus, the synthesis unit 42 may not synthesize the first stream and the second stream with respect to the disappearing avatar described above, by using the depth information and by using the depth information included in the third stream. In this case, there is an advantage that it is possible to reduce the load of the synthesis processing.

Step 6

The system of an example provides the synthesized stream to the user terminal according to the user (step S206).

Note that, instead of the configuration described above, in step 4, the first information source terminal may not send information according to the video on the depth side to the system of an example, by using the depth information. Specifically, in a case where it is determined that the first stream is a stream that is not synthesized by being concealed with the second stream, by using the third stream according to the depth information, such as a case where the avatar that is played by the first information source provider disappears behind the game video, the first information source terminal may not send the first stream to the system of an example. In this case, the first stream that is not synthesized is not originally transmitted, and thus, there is an advantage that it is possible to decrease the information of the communication path from the first information source terminal to the system of an example including the synthesis unit 42.

4-3. Third Embodiment

Figure 15:
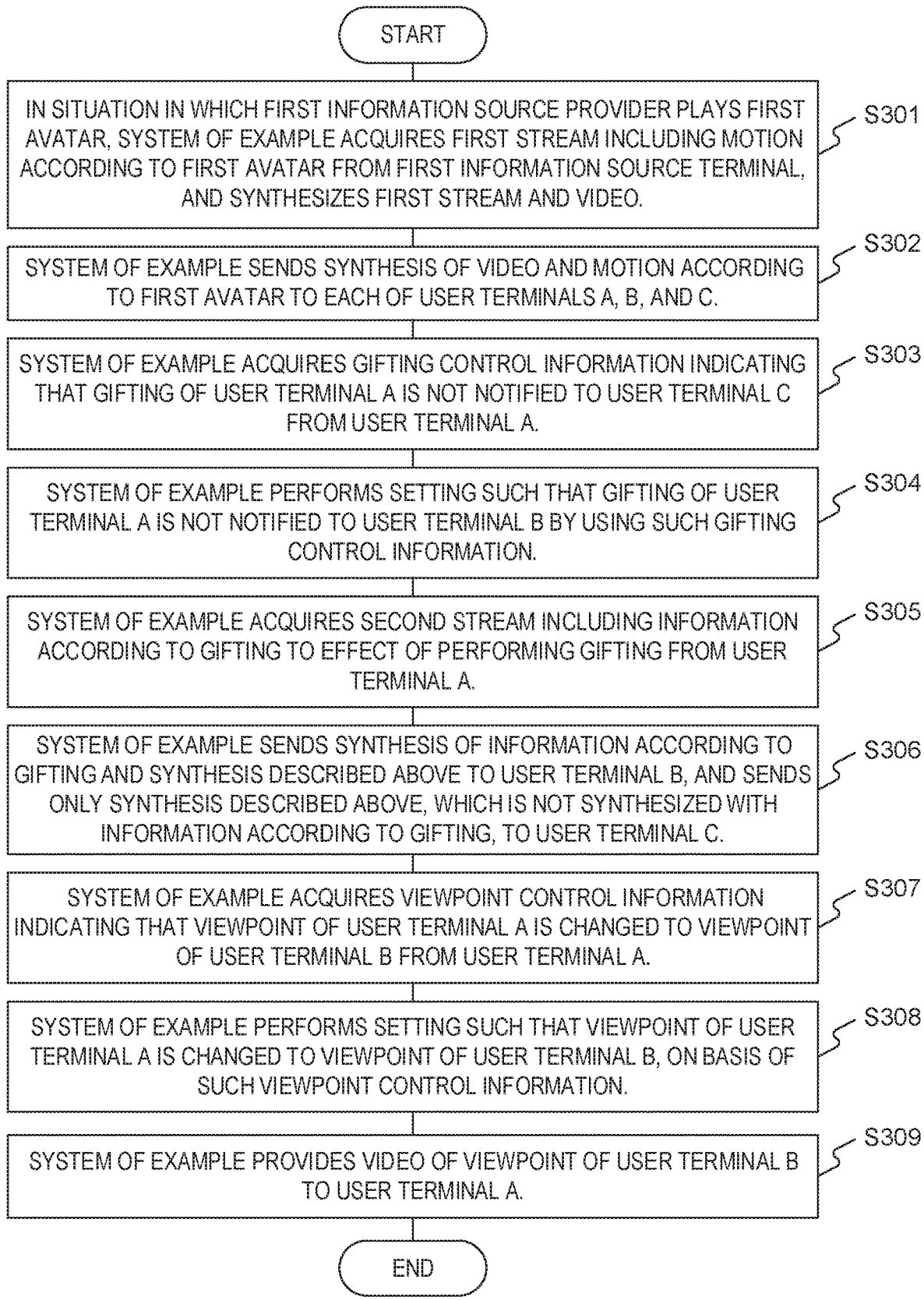
FIG. 15 is an example of the flow that is processed by the system according to one embodiment.

Next, a flow of information processing according to a third embodiment that is one aspect of the present disclosure will be described by using FIG. 15. In the system according to the aspect described in the third embodiment, a situation in which the first information source provider plays the first avatar, the first information source terminal retrieves a motion according to the first information source provider, and the viewer (the user) is viewing that the video and the first avatar are synthesized in the server is set as a target. In addition, the number of users is three of A, B, and C, and a terminal that is used by each of the users is a user terminal A, a user terminal B, and a user terminal C. A performs setting such that gifting is not disclosed to C, and then, performs the gifting. Here, the user terminal A may be the information source terminal. In addition, the viewpoint of the user terminal A is changed to the viewpoint of the user terminal B.

Step 1

In a situation in which the first information source provider plays the first avatar, the system of an example retrieves the first stream including the motion according to the first avatar from the first information source terminal, and synthesizes the first stream and the video (step S301).

Step 2

The system of an example sends the synthesis of the video and the motion according to the first avatar to each of the user terminals A, B, and C (step S302).

Step 3

The system of an example retrieves the gifting control information indicating that the gifting of the user terminal A is not notified to the user terminal C from the user terminal A (step S303). The gifting control information may include information according to the user A, as gifting that is not notified. In addition, the gifting control information may include the user terminal C, or may include a group including the user terminal C, as a partner to which the gifting is not notified. In addition, the fact that the gifting that is not notified is the gifting based on the user terminal A may be specified by being the gifting control information that is notified from the user terminal A.

Step 4

The system of an example performs setting such that the gifting of the user terminal A is not notified to the user terminal B by using the gifting control information (step S304).

Step 5

The system of an example retrieves the second stream including the information according to the gifting to the effect of performing the gifting from the user terminal A (step S305).

Step 6

The system of an example sends the synthesis of the information according to the gifting and the synthesis described above to the user terminal B, and sends only the synthesis described above, which is not synthesized with the information according to the gifting, to the user terminal C (step S306).

Step 7

The system of an example retrieves viewpoint control information indicating that the viewpoint of the user terminal A is changed to the viewpoint of the user terminal B from the user terminal A (step S307).

Step 8

The system of an example performs setting such that the viewpoint of the user terminal A is changed to the viewpoint of the user terminal B, on the basis of the viewpoint control information (step S308).

Step 9

The system of an example provides a video of the viewpoint of the user terminal B to the user terminal A (step S309).

In addition, the system and the information processing described in this specification may be implemented by software, hardware, or a combination thereof, a part or all of the system and the information processing may be mounted as a computer program such that the processing and the procedure are executed by various computers, and such a computer program may be stored in a storage medium. In addition, the program may be stored in a non-transitory or temporary storage medium.

It is obvious that the description in this specification is not limited to the description in this specification, and can be applied to various examples within the scope of various technical ideas having the advantages or the configurations on various technologies described in this specification.

What is claimed is:

1. A non-transitory computer readable medium comprising instructions that, when executed by a processor, cause the processor to
   retrieve a first stream of a first data type including a motion, a sound, a comment, or information relating to gifting, and a second stream of a second data type including a background video, the first data type including intermediate information including depth information relating to the background video and depth information relating to the motion, wherein the motion is a motion of an avatar;
   determine whether or not to perform synthesis by using the intermediate information;
   generate synthesized data from the first stream and the second stream based on the determination, the synthesized data relating to the first data type and the second data type, such that the motion of the avatar is synthesized with the background video; and
   transmit the synthesized data.

2. The medium according to claim 1,
   wherein a third stream of the second data type is retrieved, and
   the synthesized data and the third stream are synthesized.

3. The medium according to claim 1,
   wherein a fourth stream of the first data type is retrieved, and
   the synthesized data and the fourth stream are synthesized.

4. The medium according to claim 1,
   wherein the first stream includes first time information and the second stream includes second time information, and
   the first time information and the second time information are adjusted to have a predetermined relationship, and the first stream and the second stream are synthesized.

5. The medium according to claim 1,
   wherein synthesis of the synthesized data is performed by a server.

6. The medium according to claim 1,
   wherein the first stream is retrieved from a first information source terminal,
   the second stream is retrieved from a second information source terminal, and
   synthesis of the synthesized data is performed by the first information source terminal or the second information source terminal.

7. The medium according to claim 1,
   wherein synthesis of the synthesized data is performed by a user terminal, and the synthesized data is provided by the user terminal.

8. The medium according to claim 1,
   wherein the synthesized data is provided to one or a plurality of user terminals.

9. The medium according to claim 1,
   wherein information relating to a viewpoint in a game space is retrieved from one user terminal, and the viewpoint in the game space is changed.

10. The medium according to claim 9,
    wherein the viewpoint in the game space is changed to a viewpoint in a game space according to any one user of a user terminal set in advance.

11. The medium according to claim 9,
    wherein the viewpoint in the game space is changed to a viewpoint in one location in a game space other than a user terminal set in advance.

12. The medium according to claim 11,
    wherein the change to the viewpoint in the one location in the game space other than the user terminal set in advance is performed by using a provision of a predetermined valuable product as a condition.

13. The medium according to claim 1,
    wherein production based on one synthesized data item that is provided in one user terminal is different from production based on one synthesized data item that is provided in another user terminal.

14. The medium according to claim 1,
    wherein the first data type includes the information relating to gifting,
    the second data type includes a video that is subjected to moving image distribution, and
    synthesis of the synthesized data includes reflection of the information relating to gifting on the video that is subjected to the moving image distribution.

15. The medium according to claim 1,
    wherein the information relating to gifting, the sound, or the comment is subjected to a predetermined setting based on one or a plurality of specific information source terminals, and is not provided to another one of the one or a plurality of specific user terminals.

16. The medium according to claim 15,
    wherein the predetermined setting is performed by control information based on one user terminal.

17. The medium according to claim 1,
    wherein the sound or the comment is provided in accordance with a user attribute associated with one user terminal.

18. The medium according to claim 17,
    wherein the sound or the comment is provided to an extent according to the user attribute associated with the one user terminal.

19. The medium according to claim 17,
    wherein the user attribute includes a viewing period.

20. The medium according to claim 17,
    wherein the user attribute includes the location in a game space.

21. The medium according to claim 17,
wherein the user attribute includes presence or absence of provision of a valuable product or an extent of the provision.

22. The medium according to claim 1,
wherein the processor is a central processing unit (CPU), a microprocessor, or a graphics processing unit (GPU).

23. The medium according to claim 1,
wherein the processor is mounted on a smartphone, a tablet, a mobile phone, or a personal computer.

24. A server device, comprising:
a processor,
wherein the processor is configured to:
retrieve a first stream of a first data type including a motion, a sound, a comment, or information relating to gifting, the first data type including intermediate information including depth information relating to a background video and depth information relating to the motion, wherein the motion is a motion of an avatar,
retrieve a second stream of a second data type including the background video,
determine whether or not to perform synthesis by using the intermediate information,
generate synthesized data relating to the first data type and the second data type based on the determination, such that the motion of the avatar is synthesized with the background video, and
transmit the synthesized data, by executing a computer readable command.

25. A terminal device, comprising:
a processor,
wherein the processor is configured to:
retrieve a first stream of a first data type including a motion, a sound, a comment, or information relating to gifting, the first data type including intermediate information including depth information relating to a background video and depth information relating to the motion, wherein the motion is a motion of an avatar,
retrieve a second stream of a second data type including the background video,
determine whether or not to perform synthesis by using the intermediate information,
generate synthesized data relating to the first data type and the second data type based on the determination, such that the motion of the avatar is synthesized with the background video, and
provide the synthesized data, by executing a computer readable command.

26. A method to be executed by a processor executing a computer readable command, the method comprising:
retrieving a first stream of a first data type including a motion, a sound, a comment, or information relating to gifting, the first data type including intermediate information including depth information relating to the background video and depth information relating to the motion, wherein the motion is a motion of an avatar,
retrieving a second stream of a second data type including the background video,
determining whether or not to perform synthesis by using the intermediate information,
generating synthesized data relating to the first data type and the second data type based on the determination, such that the motion of the avatar is synthesized with the background video, and
providing the synthesized data, by executing the command.

27. The medium according to claim 1, wherein the avatar is a first avatar and wherein the second stream of the second data type further comprises a motion of a second avatar.

28. The medium according to claim 6, wherein the avatar is a first avatar and wherein the second stream of the second data type further comprises a motion of a second avatar.

29. The medium according to claim 28, wherein the first information source terminal is the first avatar and the second information source terminal is the second avatar.

* * * * *